United States Patent
Yang et al.

(10) Patent No.: US 11,870,772 B2
(45) Date of Patent: *Jan. 9, 2024

(54) AUTHENTICATION IDENTITY MANAGEMENT FOR MOBILE DEVICE APPLICATIONS

(71) Applicant: Electronic Arts Inc., Redwood City, CA (US)

(72) Inventors: Lin Yang, Foster City, CA (US); Anand Nair, Johns Creek, GA (US); Gregory William Schaefer, Stillwater, MN (US); Yuan Fang, Menlo Park, CA (US); Danjun Xing, Fremont, CA (US); Shengyong Li, Redwood City, CA (US); Chuan Ye, Pacifica, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/736,464

(22) Filed: May 4, 2022

(65) Prior Publication Data

US 2022/0263816 A1  Aug. 18, 2022

Related U.S. Application Data

(63) Continuation of application No. 16/811,822, filed on Mar. 6, 2020, now Pat. No. 11,363,013, which is a (Continued)

(51) Int. Cl.
*H04L 9/40* (2022.01)
*H04W 12/06* (2021.01)
(Continued)

(52) U.S. Cl.
CPC ........ *H04L 63/0853* (2013.01); *A63F 13/493* (2014.09); *A63F 13/79* (2014.09);
(Continued)

(58) Field of Classification Search
CPC ............. H04L 63/0853; H04L 63/0815; A63F 13/493; A63F 13/79; G06F 21/41; H04W 12/06; H04W 12/068
See application file for complete search history.

(56) References Cited

U.S. PATENT DOCUMENTS

| 4,720,860 A | 1/1988 | Weiss |
| 6,612,928 B1 | 9/2003 | Bradford et al. |

(Continued)

FOREIGN PATENT DOCUMENTS

WO    WO 2018/136081 A1 *  7/2018  ............. G06F 21/31

OTHER PUBLICATIONS

USPTO, Office Action for U.S. Appl. No. 15/087,767, dated Mar. 20, 2018.
(Continued)

*Primary Examiner* — Christopher A Revak
(74) *Attorney, Agent, or Firm* — LOWENSTEIN SANDLER LLP

(57) ABSTRACT

An identity authenticator receives a first authentication credential from a first application at a first computing device. The identity authenticator then determines that the first authentication credential is associated with a second authentication credential for the first application at a second computing device based on a stored authentication identity. The identity authenticator then provides a stored execution state for the first application to the first computing device, wherein the stored execution state is associated, based on the stored authentication identity, with at least one of the first authentication credential or the second authentication credential.

20 Claims, 15 Drawing Sheets

Related U.S. Application Data continuation of application No. 15/087,767, filed on Mar. 31, 2016, now Pat. No. 10,631,164.

(51) Int. Cl.
  *A63F 13/493* (2014.01)
  *A63F 13/79* (2014.01)
  *G06F 21/41* (2013.01)

(52) U.S. Cl.
  CPC .......... *G06F 21/41* (2013.01); *H04L 63/0815* (2013.01); *H04W 12/06* (2013.01); *H04W 12/068* (2021.01)

(56) References Cited

U.S. PATENT DOCUMENTS

| | | |
|---|---|---|
| 6,709,333 B1 | 3/2004 | Bradford et al. |
| 7,055,027 B1 | 5/2006 | Gunter et al. |
| 7,580,972 B2 | 8/2009 | Jones et al. |
| 7,685,416 B2 | 3/2010 | Newcombe et al. |
| 7,895,261 B2 | 2/2011 | Jones et al. |
| 8,108,687 B2 | 1/2012 | Ellis et al. |
| 8,286,227 B1 | 10/2012 | Zheng |
| 8,347,370 B2 | 1/2013 | Headley |
| 8,572,684 B1 | 10/2013 | Sama |
| 8,986,116 B1 | 3/2015 | Harrington |
| 9,100,387 B2 | 8/2015 | Balakrishnan et al. |
| 9,164,997 B2 | 10/2015 | von Haden et al. |
| 9,380,324 B2 | 6/2016 | Schoenwald |
| 9,433,862 B2 | 9/2016 | Bruno, Jr. et al. |
| 9,501,484 B2 | 11/2016 | Von Haden et al. |
| 9,628,465 B2 | 4/2017 | Balakrishnan et al. |
| 9,669,310 B2 | 6/2017 | Green |
| 9,736,141 B2 | 8/2017 | Yefimov et al. |
| 9,742,750 B2 | 8/2017 | Obasanjo et al. |
| 9,795,879 B2 | 10/2017 | Colenbrander |
| 10,631,164 B2 | 4/2020 | Yang |
| 11,363,013 B2 * | 6/2022 | Yang ................ G06F 21/41 |
| 2007/0192484 A1 | 8/2007 | Yamaoka et al. |
| 2008/0070688 A1 | 3/2008 | Loehrer |
| 2008/0300049 A1 | 12/2008 | Anderson et al. |
| 2012/0322537 A1 | 12/2012 | Antkowiak et al. |
| 2013/0066832 A1 | 3/2013 | Sheehan et al. |
| 2014/0189808 A1 | 7/2014 | Mahaffey et al. |
| 2014/0213363 A1 | 7/2014 | Harvey et al. |
| 2014/0289331 A1 | 9/2014 | Chan et al. |
| 2014/0289333 A1 | 9/2014 | Chan et al. |
| 2014/0342801 A1 | 11/2014 | Fujisawa et al. |
| 2014/0359735 A1 | 12/2014 | Lehmann et al. |
| 2015/0235521 A1 | 8/2015 | Lutnick |
| 2015/0319154 A1 | 11/2015 | Balakrishnan et al. |
| 2016/0166936 A1 | 6/2016 | Millegan et al. |
| 2017/0302659 A1 | 10/2017 | Shteingart et al. |
| 2018/0131658 A1 | 5/2018 | Bhagwan et al. |
| 2019/0158484 A1 | 5/2019 | Grunewald |
| 2019/0188943 A1 | 6/2019 | Humphrey |
| 2019/0217190 A1 | 7/2019 | Shitara |
| 2019/0370457 A1 * | 12/2019 | Shultz ................ G06F 21/45 |
| 2020/0306643 A1 | 10/2020 | Borovikov |
| 2023/0041033 A1 * | 2/2023 | Park ................ H04W 8/183 |

OTHER PUBLICATIONS

USPTO, Final Office Action for U.S. Appl. No. 15/087,767, dated Oct. 3, 2018.
USPTO, Office Action for U.S. Appl. No. 15/087,767, dated Apr. 24, 2019.
USPTO, Final Office Action for U.S. Appl. No. 15/087,767, dated Oct. 29, 2019.
USPTO, Advisory Action for U.S. Appl. No. 15/087,767, dated Dec. 17, 2018.
USPTO, Notice of Allowance for U.S. Appl. No. 15/087,767, dated Jan. 31, 2020.
Hoffman, "5 Ways Gamers Can Save Game Progress to the Cloud". Nov. 5, 2013, p. 1-24. https://www.makeuseof.com/tag/5-ways-gamers-can-save-game-progress-to-the-cloud-si/.

* cited by examiner

AUTHENTICATION IDENTITY MANAGEMENT FOR MOBILE DEVICE APPLICATIONS

RELATED APPLICATIONS

This application is a continuation of U.S. patent application Ser. No. 16/811,822 filed on Mar. 6, 2020, which is a continuation of U.S. patent application Ser. No. 15/087,767 filed on Mar. 31, 2016, issued as U.S. Pat. No. 10,631,164 on Apr. 21, 2020. Both above-referenced applications are incorporated by reference herein.

TECHNICAL FIELD

The present disclosure is generally related to computer systems and, more specifically, to authentication identity management in gaming computer systems.

BACKGROUND

A mobile game is a video game application that may be played by a user on a mobile device such as a feature phone, smartphone, smartwatch, PDA, tablet computer, portable media player, etc. Mobile games may be available on gaming platforms that can additionally include personal computers (PCs), gaming consoles, and/or other computing devices, providing a user the ability to play games over a computer network. Some gaming platforms, such as the Origin® platform by Electronic Arts Inc., can provide social features like profile management, networking with friends, and integration with other networking sites like Facebook®, Microsoft's Xbox Live®, Sony's PlayStation Network®. A player of a mobile game on a mobile device may need to provide authentication credentials to establish a user identity within a gaming platform. Interaction between platforms may involve management of multiple user profiles across multiple devices.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
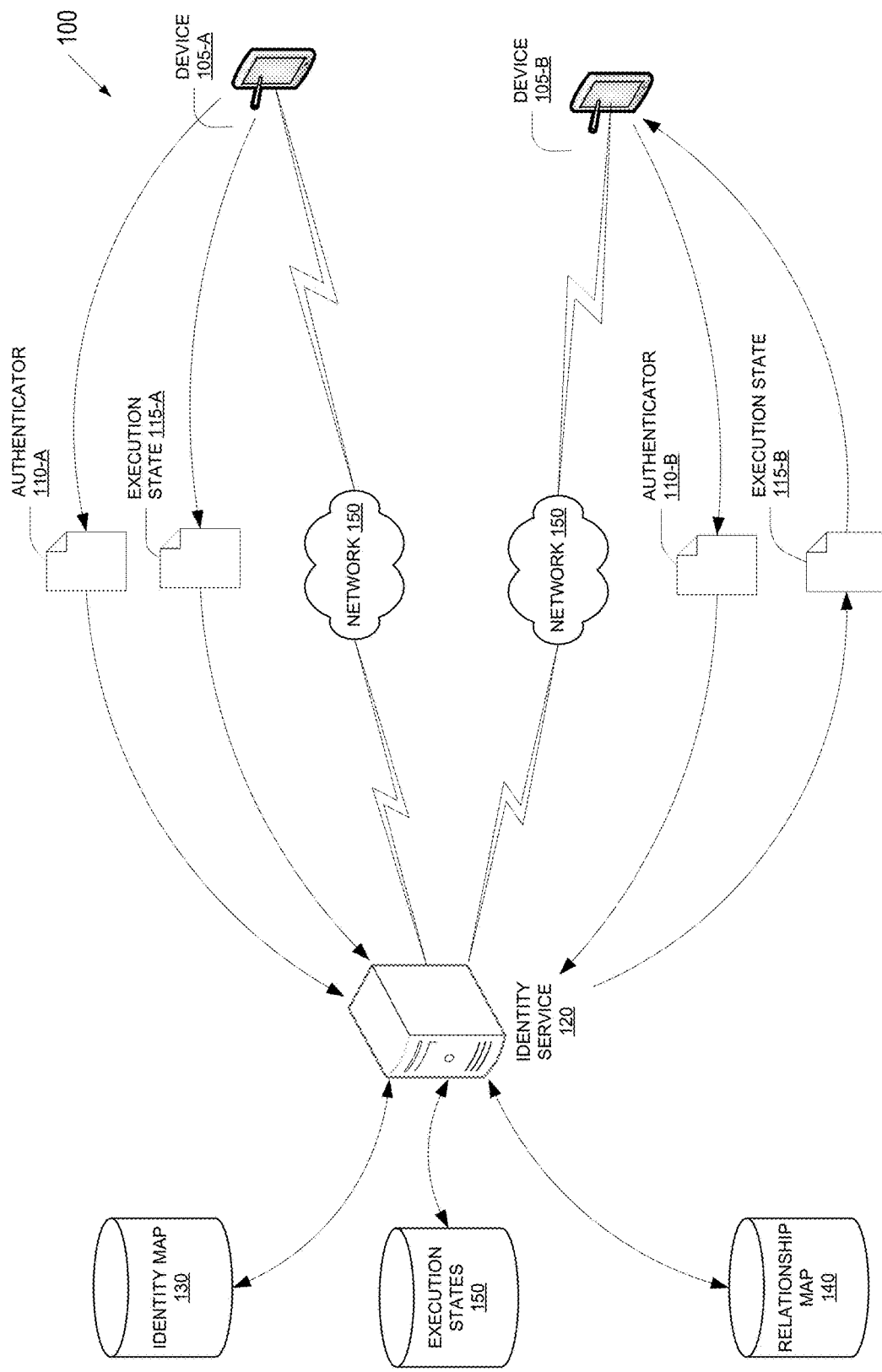
FIG. 1 depicts a schematic diagram of an example network architecture showing an example exchange between multiple devices and an identity authenticator, in accordance with one or more embodiments of the present disclosure.

Described herein are methods and systems for authentication identity management for applications in an application framework. For example, a player of a mobile game on a mobile device may need to provide authentication credentials to establish a user identity within a gaming platform. Authentication credentials can be useful to manage user access to content, provide software updates, establish social networking within the platform, manage a saved execution state for a game application, and provide security features for the platform by preventing unauthorized access. Interaction between platforms may involve management of multiple user profiles across multiple devices. Typical users of mobile gaming applications download a game application to a device and begin playing the game without establishing a user profile for that game on the game provider's platform, which can reduce the effectiveness and stability of the gaming platform. Additionally, if a user utilizes different authentication credentials for different devices, many gaming platforms may not be able to associate the different devices with a single user identity. Moreover, gaming platforms do not commonly manage more than a single execution state for any particular gaming application. Thus, if a user plays the same game on multiple devices, that user may not be able to choose among multiple execution states for that game.

Embodiments of the present disclosure can provide an enhanced framework for managing the authentication credentials and application activity associated with a single user identity across applications, authentication services, social networks, and other gaming platforms. A stored "identity map" may be generated based on user behavior that can associate a user's device with any authentication credentials provided by the user and store it as a single "identity". Thus, any credentials provided by the user on the device may be associated with the user's identity, establishing a link that may be used across devices. If the user uses one of the same authentication credentials on a second device, the identity map may be used to create an association between the two devices. Thus any new authentication credential used on the second device may be automatically associated with the first device. Once the association between the devices has been established, the game state of any game played by the user on one of the devices may be accessed on the other device. Notably, the identity map can store and manage multiple execution states for each of the devices, thus providing the user with the ability to play multiple versions of the game on both devices.

In one embodiment an identity service may generate a stored identity map. The identity service can receive authentication credentials (e.g., an "authenticator") for an application from a computing device (e.g., a mobile device). The identity service can then receive authentication credentials from a second application on the computing device. In response to determining that the authentication credentials for both applications originated from the same device, the identity service can store an association between the two authentication credentials in a stored identity map. The identity service can then store execution states for each application and associate the execution states with the stored identity. The identity service may also associate the computing device with the stored identity. Upon receiving an authentication credential from one of the applications at a second device, the identity service can use the information in the stored identity to identify available game states for the applications and provide them to the second device.

In another embodiment, the identity service can receive an authentication credential from an application at a mobile device. The identity authenticator can then determine that the authentication credential is associated with a stored identity, identify a plurality of stored execution states for the application associated with the stored identity, select one of the plurality of stored execution states for the application to be provided to the mobile device while the remainder of the plurality of stored execution states for the application are retained in a storage device, and provide at least one of the execution states to the mobile device.

In another embodiment, the identity service can generate a relationship map. The relationship map can include a simplified version of the stored identity map relationships to facilitate efficient information access for a particular "identity." The relationship map may be structured such that there is a single "parent" node with all other information associated with the user identity stored as child nodes of the single parent. The relationship map can thus facilitate more efficient analysis of all authentication activity associated with a particular users identity.

FIG. 1 is a schematic diagram depicting an illustrative network architecture 100 showing an example exchange between an identity service 120 and multiple devices 105 (e.g., devices 105-A, 105-B), in accordance with embodiments of the disclosure. The devices 105 may be and connected to the identity service 120 via one or more networks 150. While, for simplicity, various illustrative components of the network architecture 100 may be described herein in the singular, it should be appreciated that multiple components may be provided in various example embodiments of the disclosure.

The devices 105 may be mobile computing devices such as a mobile telephone (e.g., cellular telephone), tablet computer, personal digital assistant (PDAs), portable media player, netbook, laptop computer, portable gaming console, wearable device (e.g., smart watch), or the like. Devices 105 may also be a traditionally non-mobile computing devices such as a television set top box, a smart television, a desktop computer, and/or any other device that can execute applications ("apps"). Devices 105 may also be any other network-capable device that can generate secure and verifiable authentication credentials. For example, devices 105 may download an application from an application provider or publisher, execute the application, and communicate with an identity authentication service associated with the application to maintain a user's authentication credentials as well as the execution state of the application. Devices 105-A and device 105-B may be different types of devices that are capable of executing the same application or different applications. For example, device 105-A may be a mobile telephone, and device 105-B may be a tablet computer.

A device 105 may display or otherwise execute applications. The term application as used herein can refer to any software module capable of being executed by the device 105. In some implementations, applications may be "mobile applications" specifically tailored for a mobile device. Examples of applications can include computer games, financial applications, productivity applications (e.g., to-do list managers), content creation applications (e.g., drawing, video recording, audio recording, etc.), business applications (e.g., word processing, spreadsheet, etc.), electronic publications (e.g., electronic versions of written works such as electronic books (e-books), electronic textbooks, electronic journals, electronic magazines, etc.), videos (e.g., movies, television show episodes), or the like.

In some embodiments, a user may access an application on devices 105 by utilizing an authentication credential (e.g., a user sign-on and password). The authentication credential may be established for a particular application or application framework. For example, a computer game publisher may establish a framework for granting access to that publisher's games. The authentication credential may also be established using a third party service that is not associated with the specific application. Examples of third party authentication credentials may include credentials for social networking services (e.g., Facebook®, Twitter®, LinkedIn®, etc.), gaming platforms (Apple iOS Game Center®, Google Play Store®, Electronic Arts Origin®, Steam®, Xbox Live®, Sony PlayStation® Network, etc.), or the like. A user may also choose to invoke an application anonymously, that is, without using a specific authentication credential. In such instances, an authentication credential may be generated that is associated with the device 105. For example, an authentication credential may be generated by the device 105 that includes a unique device identifier associated with the device.

Devices 105 may additionally store execution state information associated with any applications installed in the device. Execution state information may include user profile information, data created and modified by the application, application configuration information, or the like. In an illustrative example, the execution state information associated with a computer game on a mobile device may include the level of the game being played, the user's score, settings for the game, any game achievements earned by the user, etc.

In embodiments, devices 105 may send authentication credentials (authenticator 110) and execution state information (execution state 115) to identity service 120 via network 150. Identity service 120 corresponds to any functionality or combination of functionality for maintaining a unified user identity that associates multiple authenticators 110, multiple execution states 115, and multiple devices 105 with each other. Identity service 120 may store and maintain the identity based on user behavior received from devices 105. Identity service 120 can be a component of network-accessible server-based functionality (e.g., a gaming platform server), various data stores, and/or other data processing equipment. Identity service 120 may be a component of one or more machines (e.g., one or more server computer systems, routers, gateways, etc.) that have processing and storage capabilities to provide server-based functionality.

In one embodiment, identity service 120 may receive authenticator 110-A from device 105-A. Authenticator 110-A may use a particular authentication type (e.g., anonymous, Facebook®, Twitter®, iOS Game Center®, etc.), and device 105-A can have a particular device identifier. For example, a user may initiate a computer game application on device 105-A and use social networking account credentials to create a user profile for use in the game. In some implementations, a user may choose to play the game anonymously, in which case device 105-A may send an "anonymous" authenticator 110-A that is associated with the device identifier. Device 105-A may then send the authentication credentials used (authenticator 110-A) to identity service 120. In some implementations, device 105-A may send an anonymous authenticator 110-A associated with the device in addition to an authenticator associated with the social networking credentials. Thus, identity service 120 could receive two authenticators 110-A upon first use of an application.

In one embodiment, identity service 120 may communicate with one or more identity maps 130. Identity maps 130 may be data structures in memory, persistent storage, or the like. Identity service 120 may store authenticator(s) 110-A in identity map 130 and associate the authenticator(s) 110-A with device 105-A. For example, identity service 120 may first store the anonymous authenticator associated with the device, then store the authenticator with the social networking credentials, and associate the two authenticators with each other in identity map 130.

Identity service 120 may then receive execution state information 115-A from device 105-A associated with the application being accessed by the user. Identity service 120 may receive execution state information 115-A when the user terminates the application, upon a specific user interaction with the application to save the execution state, or in any similar manner. Identity service 120 may store the execution state information 115-A in execution states 150. Additionally, identity service 120 may store information in identity map 130 that associates the execution state 115-A with the authenticator(s) 110-A and device 105-A. Thus, the authenticator(s) 110-A, execution state 115-A, and device 105-A are associated with each other as a single "identity."

In some implementations, identity service 120 may additionally store information in relationship map 140. Relationship map 140 may be a data structure in memory, persistent storage, or the like. Relationship map 140 can include a simplified version of the stored identity map relationships to facilitate efficient information access for a particular "identity." Relationship map 140 may be structured such that there is a single "parent" node with all other information associated with the user identity stored as child nodes of the single parent. For example, when identity service 120 receives authenticators 110-A, a parent node may be created in relationship map 140 that includes the "anonymous" authenticator (e.g., the device authenticator). Then each subsequent authenticator and/or execution state received from device 105-A may be stored associated with the anonymous authenticator. Thus, all identity information associated with device 105-A may be quickly obtained using relationship map 140.

In some implementations, a user may subsequently use device 105-B to access the same application used on device 105-A. Identity service 120 may then receive one or more authenticators 110-B for the application on device 105-B (e.g., the anonymous authenticator for the device and any third party service authenticator used for the application). Responsive to receiving the authenticators 110-B, identity service 120 may first determine if the device 105-B authenticators are associated with any known identity. If the user uses the same social networking credentials on both device 105-A and 105-B for the same application, identity service 120 can access identity map 130 to determine that the social networking credentials have already been used for the application on device 105-A. Identity service 120 may then store an association between the device 105-B and the social networking authenticator already stored in identity map 130. Additionally, once an identity has been established that is associated with device 105-A, identity service 120 may store additional information in relationship map 140 to associate device 105-A with device 105-B.

Subsequently, identity service 120 may determine that the social networking authenticator is also associated with a stored execution state 115-A that was received from the application on device 105-A. Identity service 120 may send a notification to device 105-B to indicate to the application that a stored execution state for the application is available for use. For example, if the user starts a game application on device 105-A (a mobile phone), then decides to play that same game application on device 105-B (a tablet), identity service 120 may send a notification to the game application on device 105-B to give the user the option to continue the game application on device 105-B from the point in the game that the user last saved from device 105-A in execution state 115-A.

If the user opts continue the game on device 105-B that was previously played on device 105-A, identity service 120 may then send a copy of execution state 115-A to the device 105-B as execution state 115-B. Upon termination of the game application (or other event as noted above), device 105-B may send the updated execution state 115-B to identity service 120 for storage in execution states 150. Alternatively, if the user opts to not continue the game on device 105-B that was previously played on device 105-A, a new execution state for the game application may be generated for device 105-B only. Upon termination of the game application (or other event as noted above), device 105-B may send the updated execution state 115-B to identity service 120 for storage in execution states 150. In some implementations, the new execution state for the game application may be generated for device 105-B only, then the user may elect to discard that new execution state in favor of continuing the game that was previously played on device 105-A. In each case, identity service 120 may store multiple execution states associated with the two devices that the user may choose from during any subsequent execution of the game application.

Figure 2:
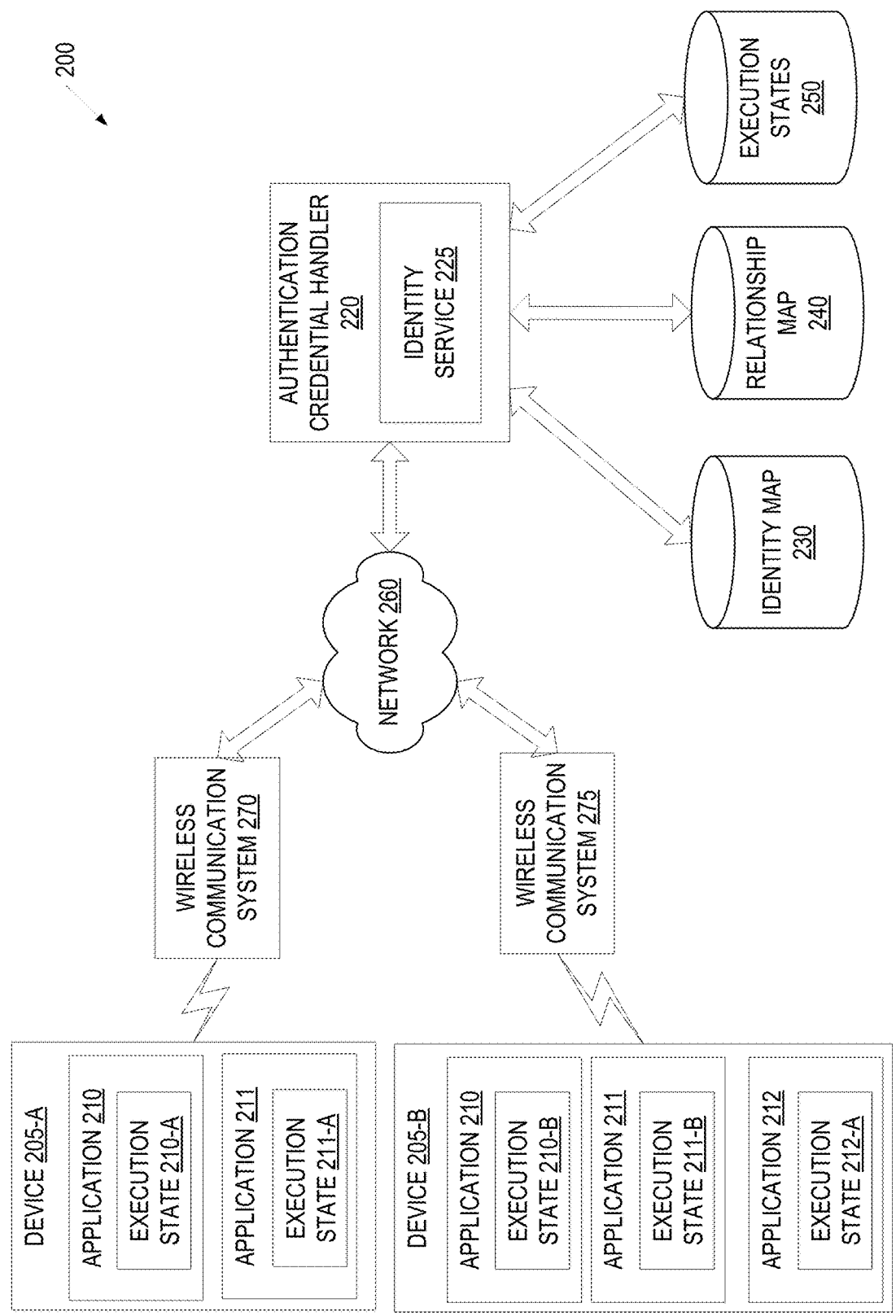
FIG. 2 depicts a high-level component diagram of an example identity authenticator network architecture, in accordance with one or more embodiments of the present disclosure.

FIG. 2 is a high-level component diagram of an example network architecture 200, in accordance with one or more embodiments of the present disclosure. One skilled in the art will appreciate that other implementations for network architecture 200 are possible, and that the implementation of a computer system utilizing examples of the invention are not necessarily limited to the specific architecture depicted by FIG. 2.

As shown in FIG. 2, the network architecture 200 may include authentication credential handler 220 and multiple devices 205-A, 205-B capable of communicating with authentication credential handler 220 via a network 260. Network 260 may include, but is not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network 260 may include, for example, metropolitan area networks (MANs), wide area networks (WANs), local area networks (LANs), or personal area networks (PANs).

The devices 205-A, 205-B may include any type of mobile computing device or traditionally non-portable computing device. The devices 205-A, 205-B may be configured with functionality to enable execution of software applications 210, 211, 212. In some implementations, applications 210, 211, 212 may be "mobile applications" specifically tailored for a mobile device. Examples of applications can include computer games, financial applications, productivity applications (e.g., to-do list managers), content creation applications (e.g., drawing, video recording, audio recording, etc.), business applications (e.g., word processing, spreadsheet, etc.), electronic publications (e.g., electronic versions of written works such as electronic books (e-books), electronic textbooks, electronic journals, electronic magazines, etc.), videos (e.g., movies, television show episodes), or the like.

Devices 205-A, 205-B may store execution state information associated with applications 210, 211, 212. Execution state information may include user profile information for the application, data created and modified by the application, application configuration information, scores or achievements for computer games, or the like. As shown in FIG. 2, execution state 210-A may be associated with application 210 on device 205-A, and execution state 211-A may be associated with application 211 on device 205-A. Similarly, execution state 210-B may be associated with application 210 on device 205-B, and execution state 212-A may be associated with application 212 on device 205-B. Notably, while application 210 may be installed on both devices 205-A and 205-B, in some embodiments each copy of application 210-A may access a separate execution state for the corresponding device.

Devices 205-A, 205-B may send authentication credentials ("authenticators") for applications 210, 211, and 212, as well as any associated execution state information, via the network 260. Communication between the authentication credential handler 220 and the devices 205-A, 205-B may be enabled via any communication infrastructure. One example of such an infrastructure includes a combination of a wide area network (WAN) and wireless infrastructure, which allows a user to use the devices 205-A, 205-B send without being coupled to the authentication credential handler 220 via hardwired links. The wireless infrastructure may be provided by one or multiple wireless communications systems, such as wireless communication systems 270, 275. One of the wireless communication systems 270, 275 may be a Wi-Fi access point connected with the network 260. Another of the wireless communication systems 270, 275 may be a wireless carrier system that can be implemented using various data processing equipment, communication towers, etc.

Authentication credential handler 220 may include an identity service 225 service 225 which can receive authentication credentials and execution state information from devices 205-A, 205-B, and generate a single user identity that may be associated with multiple devices, multiple authentication credentials, and multiple application execution states. Authentication credential handler 220 may receive requests from one of applications 210, 211, 212 to select from multiple execution states for that application, and send the selected execution state information to the requesting application on a particular device.

Authentication credential handler 220 may provide identity service 225 service 225 with access to one or more identity map 230, relationship map 240, and/or execution states 250. Each of identity map 230, relationship map 240, and/or execution states 250 may be stored in a separate data store (e.g., one or more magnetic hard disk drives, a Universal Serial Bus [USB] solid state drive, a Redundant Array of Independent Disks [RAID] system, a network attached storage [NAS] array, etc.), or alternatively in resident memory. In one embodiment, identity service 225 service 225 may generate entries for identity map 230 and relationship map 240 based on authentication credentials, device identifiers, and execution state information received from devices 205-A and 205-B. Additionally, identity service 225 service 225 may store received execution state information in execution states 250. In some implementations, identity service 225 may access identity map 230 to provide execution state information stored in execution states 250 to one of devices 205-A, 205-B during subsequent execution of applications 210, 211, 212.

In an illustrative example, identity service 225 may generate a user identity in identity map 230 by receiving a first authentication credential from application 210 at computing device 205-A. In some implementations, the authentication credential may use a first authentication type, and device 205-A may have a unique device identifier. In some implementations, the application may be a video game. The authentication type may be associated with a third party service for which the user of device 205-A maintains a user account (e.g., Facebook®, Twitter®, iOS Game Center®, etc.). The authentication credential may include the user sign on and password for the service. Alternatively, the authentication credential may be a digital token provided by the third party service that is associated with the user's sign on and password.

In some implementations, the authentication type may be associated with the unique device identifier of device 205-A. For example, if a user elects to access an application anonymously (e.g., without formally authenticating with a sign on), the authentication credential may be created to only be associated with the device 205-A. In such instances, identity service 225 may receive only the anonymous authentication credential. In some implementations, identity service 225 may receive both the anonymous authentication credential associated with device 205-A and an authentication credential provided by a service as noted above. The identity service 225 may then store an association between the device authentication credential and the service authentication credential in identity map 230.

Identity service 225 may then receive a second authentication credential from application 211 at the same computing device 205-A, where the second authentication credential uses a second authentication type (e.g., anonymous, Facebook®, Twitter®, iOS Game Center®, etc.). In some implementations the second authentication type may be the same as the first authentication type (e.g., both applications 210 and 211 send a Facebook® authentication credential). Alternatively, the second authentication type may be different than the first authentication type (e.g., application 210 sends a Facebook® authentication credential, while application 211 sends a Twitter® authentication credential).

Identity service 225 may then determine that the authentication credential received from application 210 and the authentication credential received from application 211 both originated from the same device 205-A. Identity service 225 may make this determination using the unique device identifier associated with device 205-A. Responsive to making this determination, identity service 225 may store an association between the authentication credential received from application 210 and the authentication credential received from application 211. This association may be stored in identity map 230. For example, identity service 225 may store a record in a database for each of the authentication credentials where each record refers to the other.

Additionally, identity service 225 may store an association in relationship map 240. As noted above with respect to FIG. 1, relationship map 240 can include a simplified version of the stored identity map relationships to facilitate efficient information access for a particular "identity." Relationship map 240 may be structured such that there is a single "parent" node with all other information associated with the user identity stored as child nodes of the single parent. For example, when identity authenticator 220 receives authentication credential from application 210, a parent node may be created in relationship map 240 that includes the "anonymous" authenticator (e.g., the device authenticator). Then each subsequent authenticator and/or execution state received from device 205-A may be stored associated with the anonymous authenticator. Thus, all identity information associated with device 205-A may be quickly obtained using relationship map 240.

Identity service 225 may subsequently receive execution state 210-A for application 210 from device 205-A. Once received, identity service 225 may then store the execution state 210-A in execution states 250. Any information associated with application 210 that may be used to re-instantiate application 210 or continue application 210 from the point execution state 210-A was last saved on device 205-A may be stored in execution states 250. Identity service 225 may then store an association between the execution state 210-A stored in execution states 250 with the entry in identity map 230 associated with device 205-A. The association may be an additional entry in the identity map 230 for execution state 210-A that refers to the device authenticator for device 205-A as well as the storage location in execution states 250 where execution state 210-A is stored. Identity authenticator may store a similar entry for execution state 210-A in the relationship map 240 associated with the "parent" node for device 205-A.

Identity service 225 may then receive an authentication credential from application 210 executing on device 205-B. In some implementations, application 210 on device 205-B has not been authenticated using the same authentication credential used by application 210 on device 205-A. Rather, the authenticator received from application 210 on device 205-B may be the same as the authenticator received from application 211 on device 205-A. Using the example above (where application 210 sends a Facebook® authentication credential, while application 211 sends a Twitter® authentication credential), application 210 (which executes on both devices 205-A and 205-B) may send a Twitter® authentication credential from device 205-B (instead of the Facebook® authentication credential used by application 210 on device 205-A).

Subsequently, identity service 225 may determine that the authenticator received from application 210 at device 205-B (and from application 211 at device 205-A) is associated with the authentication credential received from application 210 at device 205-A based on the stored association between the two credentials in identity map 230. As noted above, the association between the two authenticators may have been established based on the received behavior of applications 210 and 211 on device 205-A. When identity service 225 receives the authenticator for application 210 on device 205-B (e.g., the Twitter® authenticator), since that authenticator had already been stored in identity map 230, identity service 225 may use that association to determine that application 210 on device 205-B is associated with the same "identity" as application 210 on device 205-A even though two different authentication types were used on each device for that application.

In response to making this determination, identity service 225 may then provide execution state information for application 210 to device 205-B. In some implementations, identity authenticator may use the identity map 230 to identify execution state 210-A in execution states 250 and provide a copy of the execution state 210-A to application 210 at device 205-B as execution state 210-B. In some implementations, identity service 225 may receive execution state 210-B from application 210 on device 205-B and store it in execution states 250. Identity service 225 may then store an association between execution state 210-B and device 205-B in identity map 230. In some implementations, during subsequent executions of application 210 on device 205-A, identity authenticator may use the "identity" in identity map 230 to determine that there are multiple execution states associated with application 210 (e.g., execution states 210-A and 210-B). For example, as noted above, identity service 225 may use the identity map 230 information associated with device 205-A to determine that the authenticator used for application 210 on device 205-A is associated with the authenticator used for application 210 on device 205-B. In response to making this determination, identity service 225 may provide execution state 210-B to application 210 on device 205-A.

In another illustrative example, identity service 225 may use the stored identity information in identity map 230 to provide multiple execution states to multiple devices based on additional received behaviors from devices 205-A and 205-B. In some implementations, identity service 225 may receive a first authentication credential (e.g., authenticator) from application 210 at device 205-A, where the first authenticator uses a first authentication type (e.g., anonymous, Facebook®, Twitter®, iOS Game Center®, etc.). The identity service 225 may determine that the first authentication credential is associated with a stored authentication identity, where the stored authentication identity is associated with at least one of a second authentication credential, a second computing device 205-B, or a second application (e.g., applications 211, 212). In some implementations, the stored authentication identity and corresponding associations may be stored in identity map 230. As described in embodiments herein, the stored authentication identity may be generated based on previously received requests received from at least one of the second authentication credential, the second computing device, or the second application.

In one embodiment, identity service 225 may determine that the first authentication credential is associated with a stored identity by determining that the first authentication credential is associated with application 210 at the second computing device 205-B. This may occur, for example, if a user executes application 210 at device 205-A and sends an authenticator (e.g., a Facebook® authentication credentials) to identity service 225, then subsequently executes the same application 210 at device 205-B and sends the same authenticator (e.g., the same Facebook® authentication credentials) to identity service 225.

In another embodiment, identity service 225 may determine that the first authentication credential is associated with a stored identity by first determining that the first authentication credential is associated with a second application 212 at device 205-B. For example, a user may have previously accessed application 212 at device 205-B with the same Facebook® authentication credentials used to authenticate application 210 at device 205-A. This may have resulted in identity authenticator creating associations between the first authentication credential and the second application 212 as well as the device 205-B in the identity map 230. Thus, the first authentication credential may be associated with both device 205-B and 205-A. Identity service 225 may then determine that the second device 205-B is associated with a second authentication credential, and that second authentication credential is associated with the first application 210 at device 205-B. For example, the user may have previously accessed application 210 at device 205-B with the second authentication credential, thus causing that association to be created in an identity map for device 205-B.

In another embodiment, identity service 225 may determine that the first authentication credential is associated with a stored identity by first determining that the second authentication credential is associated with a second application 211-A at device 205-A. Identity service 225 may then determine that the second device 205-B is associated with the second authentication credential. Subsequently, identity service 225 may determine that the second authentication credential is associated with the first application at the second device. For example, if a user authenticates application 210 at device 205-A with a Facebook® authentication credential, and application 210 at device 205-B with the Twitter® authentication credential, a subsequent attempt to authenticate application 211 on device 205-A with the Twitter® authentication credential can cause identity service 225 to determine that the Twitter® credential is associated with a stored identity. Since the Twitter® authentication credential was already stored in the identity map due to the activity received from device 205-A, identity service 225 may determine that the subsequent use of the same Twitter® authentication credential on the second device 205-B is associated with the same "identity" that used the Twitter® credential on device 205-A.

In another embodiment, identity service 225 may determine that the first authentication credential is associated with a stored identity by first determining that a second authentication credential is associated with a second application 211-A at device 205-A, where the second authentication credential is of the same type as the first authentication credential for application 210 on device 205-A. For example, this may occur if a user (User 1) authenticates application 210 with Facebook® credentials and a second user of device 205-A (User 2) authenticates application 211 with the second user's Facebook® credentials. Identity service 225 may then determine that the second authentication credential (User 2's Facebook® credentials) is associated with the same application 211 on device 205-B. The identity service 225 may then determine that a third authentication credential is associated with the application 210 at device 205-B. For example, if User 1 had previously authenticated application 210 at device 205-B with Twitter® credentials. Since User 1's Facebook® credential is associated with User 2's Facebook® credential by their common association with device 205-A. User 2's Facebook® credential is associated with device 205-B by its association with application 211 at device 205-B. User 1's Twitter® credential is also associated with device 205-B by its association with application 210 at device 205-B. Thus, identity service 225 may use the identity map 230 to determine that User 1's Facebook® credential and User 1's Twitter® credential are associated with the same identity by tracing the associations stored in identity map 230.

In some implementations, Identity service 225 may then determine that the second authentication credential associated with application 211 at device 205-A is unauthorized. This may occur, for example, if User 2 is no longer an authorized user for device 205-A. Thus, any association with credentials for User 2 should be removed from the identity map 230. Identity authenticator may then remove any identified association between the second authentication credential and the first device 205-A in the stored authentication identity in identity map 230.

Once identity service 225 has determined that the first authentication credential is associated with a stored authentication identity, identity service 225 may then identify a plurality of stored execution states for application 210 associated with the stored authentication identity. In some implementations, identity service 225 may first identify execution state 210-A of the application 210 associated with device 205-A, and then identify execution state 210-B of application 210 associated with device 205-B. Identity service 225 may use the information stored in identity map 230 for the stored identity to identify records associated with any stored execution states for application 210. Identity service 225 may then select one of the identified plurality of stored execution states for the application 210 to be provided to the device 205-A, where the remainder of the plurality of stored execution states for application 210 can be retained in a storage device (e.g., execution states 250).

Identity service 225 may then provide the selected one of the identified plurality of stored execution states for application 210 to device 205-A. In some implementations, identity service 225 may determine whether to provide the execution state to the device based on a selection by a user, or alternatively, by selecting an execution state automatically based on the time the execution state was last accessed. Identity service 225 may make this determination based on a configuration setting. The configuration setting may be associated with the specific stored identity, or used as a default setting for all identities in the system. Alternatively, identity service 225 may make this determination based on a specific request from the device 205-A.

In one embodiment, identity service 225 may first send a notification to application 210 on device 205-A. In some implementations, the notification may include a list of execution states associated with application 210 based on the relationships for the stored identity associated with device 205-A. Alternatively, the notification may include some portion of the execution states. Identity authenticator may then receive a response from device 205-A that includes a selected execution state from the list of execution states for application 210 sent to the device 205-A. Identity authenticator may then provide the selected execution state to device 205-A. Identity authenticator may provide the selected execution state by transmitting the data for the execution state stored in execution states 250 to device 205-A.

In another embodiment, identity service 225 may select an execution state automatically based on information associated with the execution state that indicates when the execution state was last accessed. This information may be a timestamp (e.g., information including a date, time of day, a combination of the two, etc.) stored with the execution state in execution states 250. Alternatively, this information may be stored in identity map 230 that is associated with each stored execution state. In some implementations, identity service 225 may identify one of the execution states associated with application 210 based on the stored timestamp. For example, identity service 225 may identify the most recently saved execution state. Alternatively, identity service 225 may identify an execution state from a particular date, or from a particular device. Identity service 225 may then provide the identified execution state to device 205-A as described above.

Figure 3:
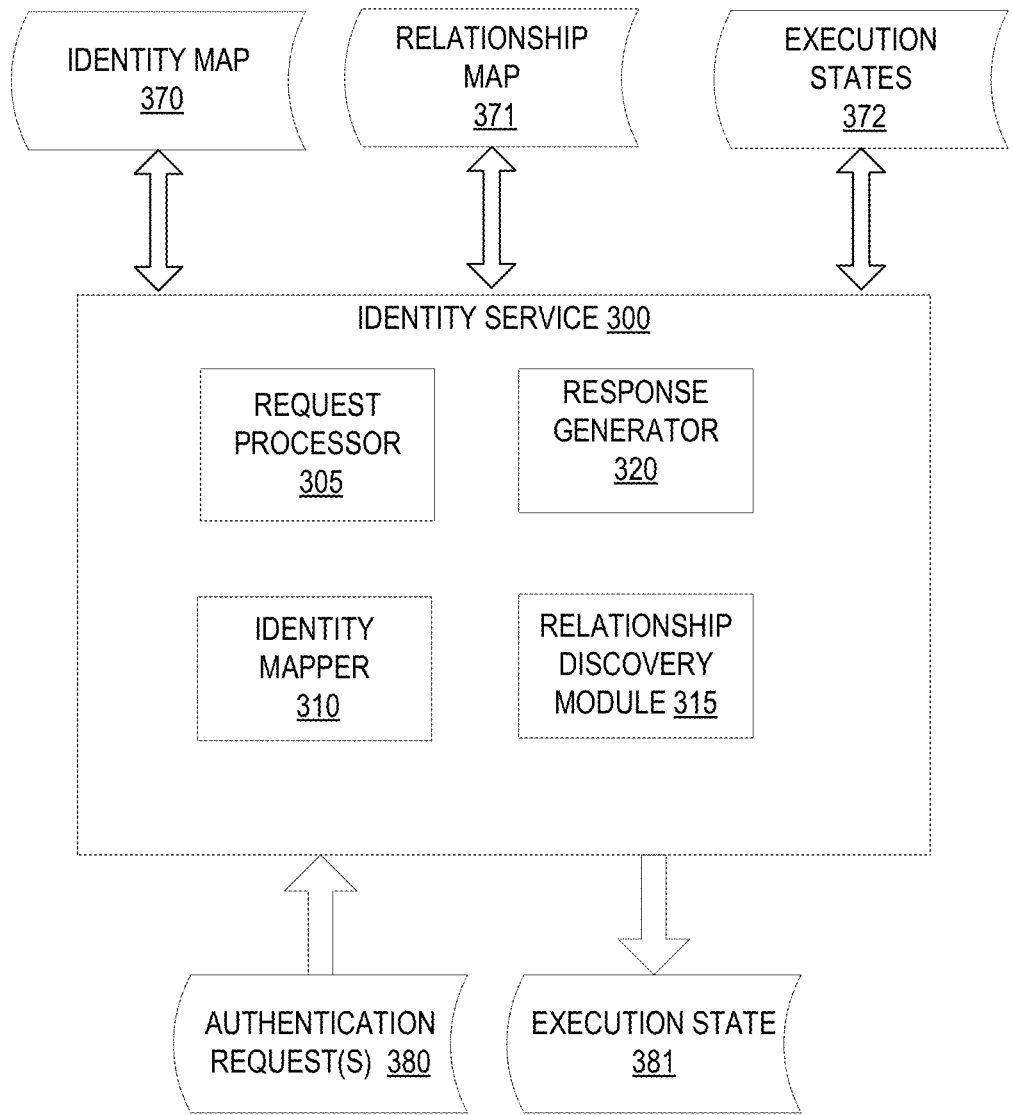
FIG. 3 depicts a component diagram of an example identity authenticator, in accordance with one or more embodiments of the present disclosure.

FIG. 3 depicts a component diagram of an example identity service 300, in accordance with one or more embodiments of the present disclosure. Identity service 300 may correspond to identity service 120 of FIG. 1, or identity service 225 of FIG. 2. In some embodiments, identity service 300 may include request processor 305, identity mapper 310, relationship discovery module 315, and response generator 320.

Request processor 305 may receive authentication requests 380 from one or more applications (e.g., application 210, 211, 212 of FIG. 2) at one or more devices (e.g., devices 105-A, 105-B of FIG. 1, and/or devices 205-A, 205-B of FIG. 2). Request processor 305 may parse the contents of authentication request 380 and determine whether any existing associations with an established identity are present in identity map 370 by invoking identity mapper 310. If an identity is already present, authentication credentials in authentication request(s) 380 may be added to identity map 310 and relationship map 371 to be associated with the existing identity. If an identity is not already present (e.g., authentication request 380 contains information with an unidentified user or device), a new identity may be created in identity map 370 and a new parent node may be created in relationship map 371.

Identity mapper 310 may access identity map 370 and relationship map 371 based on the received authentication request(s) 380 as described in further detail above with respect to FIGS. 1-2 and below with respect to FIGS. 6-13. Identity mapper 310 may also be invoked to identify one or more available execution states for an application that may have been previously stored in execution states 372. Additionally, identity mapper 310 may be invoked to store new or updated execution states for an application in execution states 372.

Response generator 320 may be invoked to provide execution state information to an application on a device via execution state 381. In one embodiment, response generator 320 may send a list of available execution states for an application to a device, then upon receiving a selection, sending the execution state data corresponding to the selected execution state. In another embodiment, response generator 320 may automatically select an execution state based on information associated with the execution state that indicates when the execution state was last accessed. The execution state data associated with the selected execution state may then be sent to the device.

Relationship discovery module 315 may be invoked to access relationship map 371. As noted above, relationship map 371 may be constructed at the same time as identity map 370 based on received authentication behavior. Relationship may 371 can provide a more efficient view of identity relationships by establishing a parent node the first time a user accesses an application, and associating all other related devices, authenticators, application execution states, etc. with the parent node. In an illustrative example, the first authenticator received by identity service 300 may be an "anonymous" authenticator associated with a device identifier. Thus the anonymous authenticator may be the stored as the parent node for the identity. Then, any subsequent application execution state, or other authenticator used for another application on that same device may be stored as child nodes of the anonymous parent node. Moreover, as additional devices and execution states are associated with the first device, additional child nodes may be added to the parent. An example of a relationship map is further described below with respect to FIG. 5.

The relationship map may be accessed for data analytics to monitor the overall activity of a particular user identity. This can provide a more efficient method of analyzing an identity since the identity map need not be traversed node by node. Since the relationship map has been created at the same time as the identity map, the relationship map has been collapsed to provide every relationship for an identity associated with a single main device. Usage monitoring and reporting may be consolidated into a single "connected user" that shows all applications accessed by all related authenticators that have been identified as the same identity (e.g., the same person).

Analytics produced by relationship discovery module 315 may be used to quantify the overall application usage of a particular user, as well as determine a "lifetime value" of that user within the application framework. For example, relationship discovery 315 may determine how much money a user has spent across all applications, which is particularly useful with in-game purchases for computer games. Relationship discovery module 315 may also use relationship map 371 to provide enhanced application management or enhanced gameplay by providing a more streamlined method of identifying available execution states for a "connected user."

Relationship discovery module 315 may also be used to perform advanced data mining for use with marketing, sales, and promotional activities. In one embodiment, relationship discovery module 315 may be used to identify for cross-platform relationships. For example, if a user plays a game on mobile device 1, then plays that same game on a gaming console platform, the relationship discovery module may identify an connection between the mobile device and the console based on the user and subsequently identify the user as a target for a particular marketing campaign, application software upgrade, bonus content for a cross-platform application, etc.

Similarly, relationship discovery module 315 may be used to identify cross-title relationships. For example, relationship discovery module 315 may access the relationship map 371 to identify all game applications played by a single user. This is particularly powerful where a user has used different authentication credentials for different games on different devices. By using the relationship map 371, relationship discovery module 315 can identify all games associated with a single "identity." Relationship discovery module 315 may subsequently generate targets for promotional activities or software updates based on commonly played games by a single user.

Relationship discovery module 315 may be invoked to perform social networking functions within the application authentication framework. For example, relationship discovery module 315 may access relationship map 371 to track groups of "friends" from different authenticators and map them to a single user. For example, a user may use a Facebook® credential to authenticate with game 1 and play game 1 with Facebook® friends. The user may also use an iOS Game Center® credential for game 2 and play game 2 with iOS Game Center® friends. Relationship discovery module 315 may identify any of the user's Facebook® friends that are also on iOS Game Center® and playing game 2. Relationship discovery module 315 may then send a notification to the user to connect with those friends in game 2.

Relationship discovery module 315 may also be invoked to provide fraud protection services to the application framework. In typical fraud behavior, an unauthorized user or bad actor (e.g., a hacker) may abuse an application framework (such as a gaming platform) by creating many false (dummy) accounts using the same device or a small subset of devices. Relationship discovery module 315 may use the relationship map 371 to identify any authenticators associated with a single device, and if the number exceeds a threshold number of devices, the identity may be marked as a suspected false identity. Additionally, relationship discovery module 315 may examine the authenticators associated with the suspected false identity and determine whether a pattern of usage for each of the authenticators is similar, which may act as confirmation that he identity is false. Relationship discovery module 315 may also determine whether a pattern of application activity (e.g., gameplay) for the authenticators associated with the false identity is indicative of automation (e.g., a "bot") rather than a human player.

Figure 4:
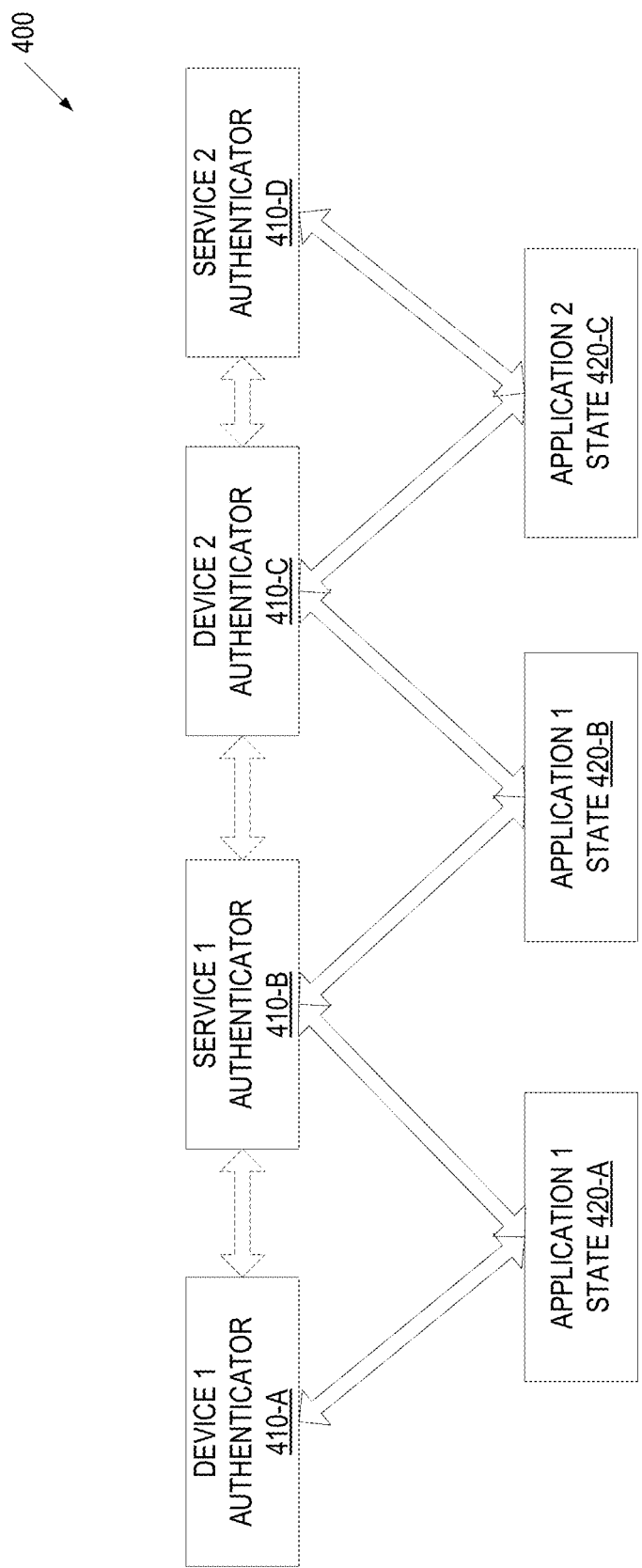
FIG. 4 illustrates an example of an authentication identity map, in accordance with one or more embodiments of the present disclosure.

FIG. 4 illustrates an example of an authentication identity map 400, in accordance with one or more embodiments of the present disclosure. Identity map 400 may correspond to identity map 130 of FIG. 1, identity map 230 of FIG. 2, and/or identity map 330 of FIG. 3. Identity map 400 may be created by an identity authenticator in response to authentication activity received from devices within an application authentication framework, such as that described in further detail above with respect to FIGS. 1-3 and below with respect to FIGS. 6-13.

Identity map 400 may be initially created in response to receiving device 1 authenticator 410-A from a device. In some implementations, device 1 authenticator 410-A may correspond to an "anonymous" authenticator associated with the device identifier of the source device. For example, when a user opts to play a game application on a mobile device without signing into the app with specific sign on credential, device 1 authenticator 410-A may be created. At the conclusion of the user's game session, an entry for application 1 state 420-A may be stored in the map to associate device 1 authenticator 410-A with the execution state for the application. If the user opts to authenticate using an authentication credential from another service (e.g., Facebook®, Twitter®, iOS Game Center®, etc.), an entry for the service authenticator may be stored in the map as service 1 authenticator 410-B, which may also be associated with application 1 state 420-A. Thus, both device 1 authenticator 410-A and service 1 authenticator 410-B may both be associated with application 1 state 420-A, and accordingly, associated with each other as illustrated by the arrows in FIG. 4.

The user may subsequently use a second device to play the same game on a second device (a tablet device, for example). As with the first device, an authenticator for the second device may be created in the map, and stored as device 2 authenticator 410-C. If the user authenticates the game on device 2 with the same service authenticator used for device 1, the identity authenticator may present the user with the option of continuing the game from device 1 on device 2 by sending application state 1 420-A to device 2. Otherwise a new game state may be created for device 2. In either case, an entry for application 1 state 420-B may be stored in the map to associate device 2 authenticator 410-C with the execution state for the application, as well as with service 1 authenticator 410-B. Thus, both device 2 authenticator 410-C and service 1 authenticator 410-B may both be associated with application 1 state 420-B, and accordingly, associated with each other as illustrated by the arrows in FIG. 4.

The user may then use the second device to play a second game on device 2 and authenticate the second game on device 2 with a second service authenticator. At the conclusion of the user's game session for game 2, an entry for application 2 state 420-C may be stored in the map to associate device 2 authenticator 410-C with the execution state for the second application. An entry for the second service authenticator may be stored in the map as service 2 authenticator 410-D, which may also be associated with application 2 state 420-C. Thus, both device 2 authenticator 410-C and service 2 authenticator 410-D may both be associated with application 2 state 420-C, and accordingly, associated with each other as illustrated by the arrows in FIG. 4.

Figure 5:
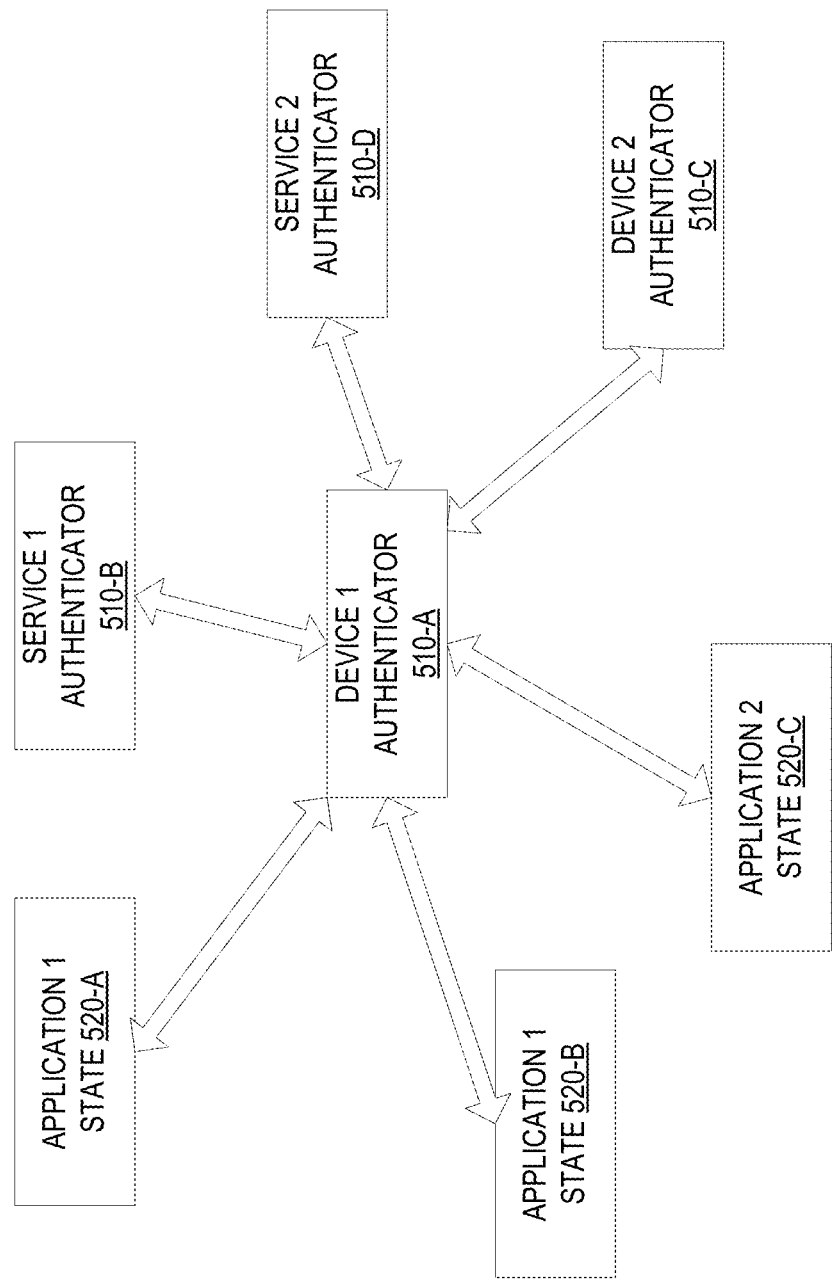
FIG. 5 illustrates an example of a deep relationship discovery map, in accordance with one or more embodiments of the present disclosure.

FIG. 5 illustrates an example of a relationship map 500, in accordance with one or more embodiments of the present disclosure. Relationship map 500 may correspond to relationship map 140 of FIG. 1, relationship map 240 of FIG. 2, and/or relationship map 340 of FIG. 3. Relationship map 500 may be created by an identity authenticator in response to authentication activity received from devices within an application authentication framework, such as that described in further detail above with respect to FIGS. 1-3 and below with respect to FIGS. 6-13. In one embodiment, relationship map 500 may be created in response to the same series of activity that created identity map 400 of FIG. 4.

In some implementations, relationship map 500 may be initially created in response to receiving the first authenticator associated with a device. The first authenticator may be used as the "parent node" or "representative node" for any subsequent activity associated the device. As shown in FIG. 5 (and as similarly shown in FIG. 4) relationship map 500 may be created with device 1 authenticator 510-A as the parent node. Following a similar chain of events as in FIG. 4, the relationship map may be updated to include application 1 state 520-A, service 1 authenticator 510-B, device 2 authenticator 510-C, application 1 state 520-B, service 2 authenticator 510-D, and application 2 state 520-C as child nodes of the parent node device 1 authenticator 510-A. Each child node will refer to device 1 authenticator 510-A as its parent and the parent node may have references to each of its child nodes.

Thus any subsequent activity in the framework that is associated with device 1, device 2, the authenticators used on those devices or the game states associated with the applications on those devices can be associated with device 1 in the relationship map. If a user accesses a third application on a third device using service 1 authenticator 510-B, an entry for the third device and an entry for the execution state of the third application may be added to the relationship map 500 for device 1 authenticator 510-A.

Figure 6:
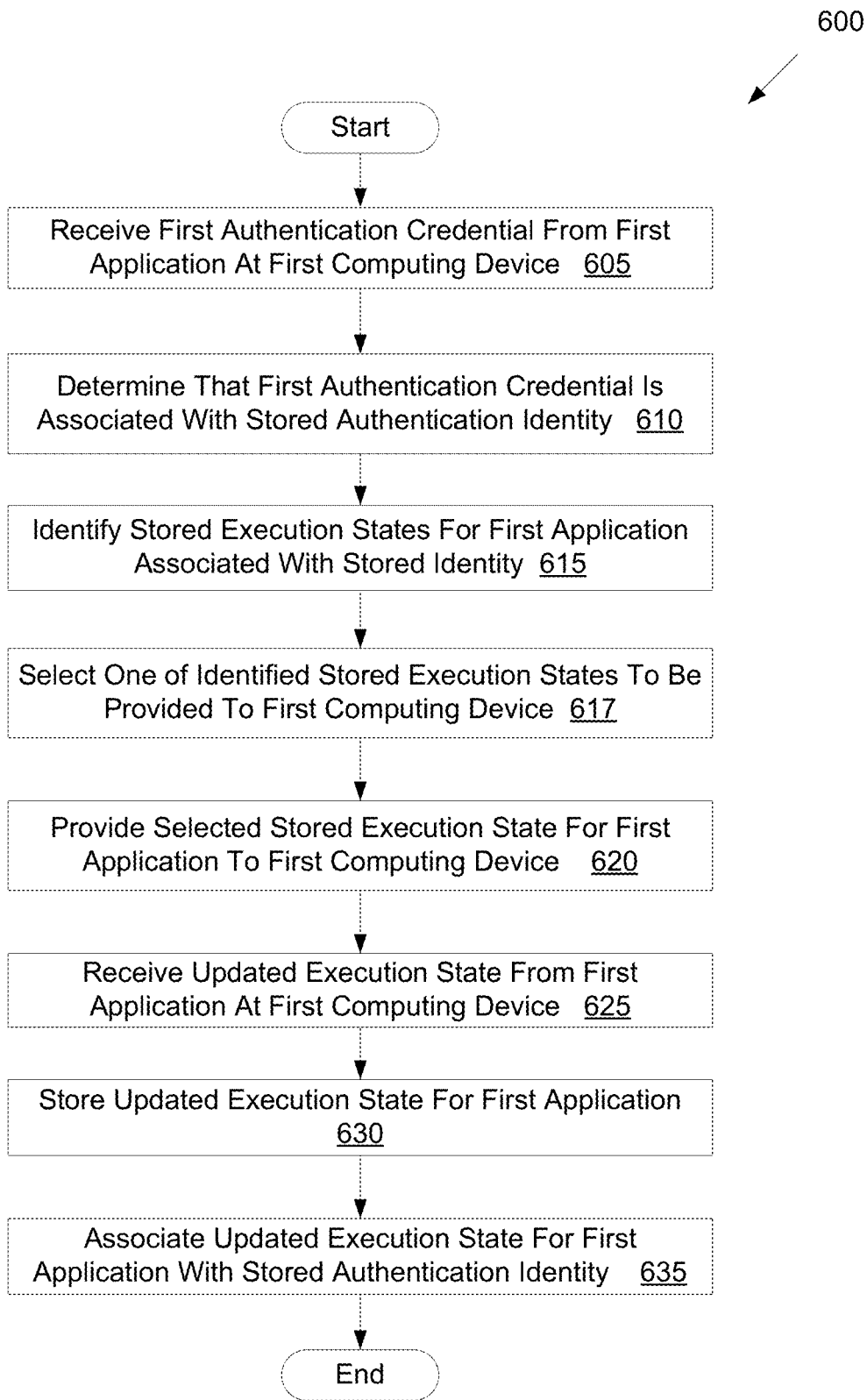
FIG. 6 depicts a flow diagram of an example method for identifying application execution states using a stored authentication identity, in accordance with one or more embodiments of the present disclosure.

FIG. 6 depicts a flow diagram of an example method 600 for identifying application execution states using a stored authentication identity. The method may be performed by processing logic that may comprise hardware (circuitry, dedicated logic, etc.), software (such as is run on a general purpose computer system or a dedicated machine), or a combination of both. In one illustrative example, method 600 may be performed by identity service 120 of FIG. 1, identity service 225 of FIG. 2, and/or identity service 300 of FIG. 3. Alternatively, some or all of method 600 might be performed by another module or machine. It should be noted that blocks depicted in FIG. 6 could be performed simultaneously (at least partially overlapping in time) or in a different order than that depicted.

At block 605, processing logic receives a first authentication credential from a first application at a first computing device. At block 610, processing logic determines that the first authentication credential received at block 605 is associated with a stored authentication identity. At block 615, processing logic identifies stored execution states for the first application associated with the stored identity. At block 617, processing logic selects one of the identified stored execution states for the first application to be provided to the first computing device. At block 620, processing logic provides the selected stored execution state for the first application to a first computing device. At block 625, processing logic receives an updated execution state from the first application at the first computing device. At block 630, processing logic stores the updated execution state for the first application. At block 635, processing logic associates the updated execution state for the first application with the stored authentication identity. After block 635, the method of FIG. 6 terminates.

Figure 7:
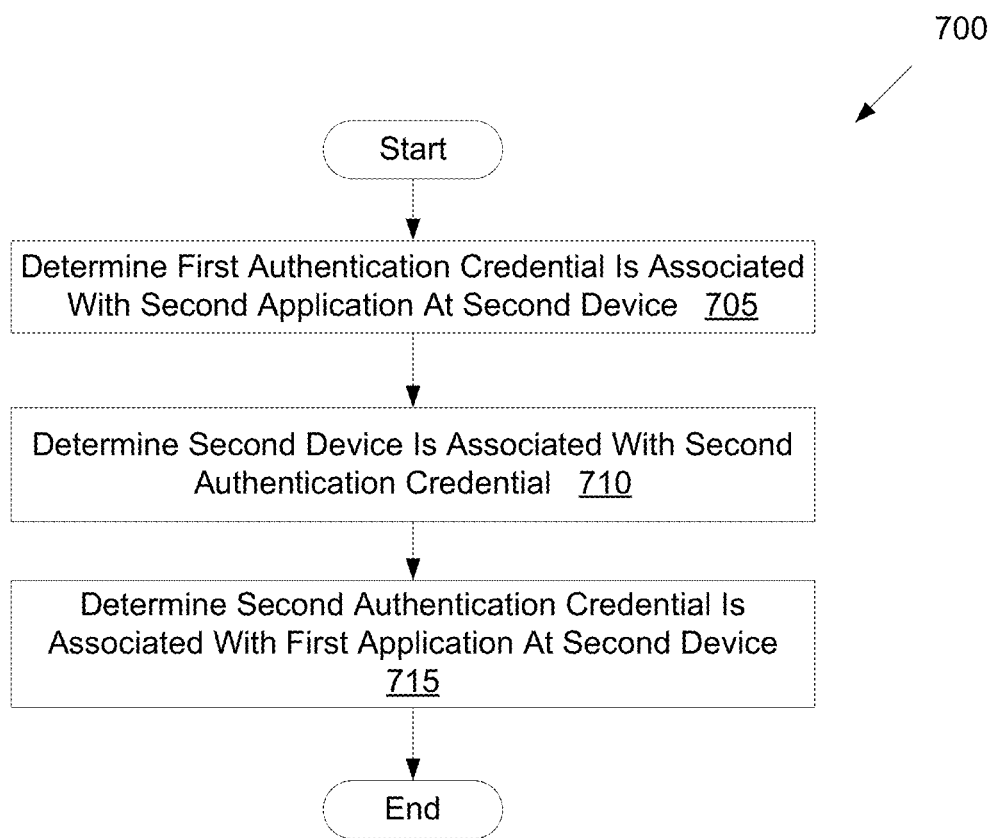
FIG. 7 depicts a flow diagram of an example method for determining that an authentication credential is associated with a stored authentication identity, in accordance with one or more embodiments of the present disclosure.

FIG. 7 depicts a flow diagram of an example method 700 for determining that an authentication credential is associated with a stored authentication identity. The method may be performed by processing logic that may comprise hardware (circuitry, dedicated logic, etc.), software (such as is run on a general purpose computer system or a dedicated machine), or a combination of both. In one illustrative example, method 700 may be performed by identity service 120 of FIG. 1, identity service 225 of FIG. 2, and/or identity service 300 of FIG. 3. Alternatively, some or all of method 700 might be performed by another module or machine. It should be noted that blocks depicted in FIG. 7 could be performed simultaneously (at least partially overlapping in time) or in a different order than that depicted.

At block 705, processing logic determines that a first authentication credential is associated with a second application at a second device. In some implementations, the first authentication credential may be received in step 605 of FIG. 6. At block 710, processing logic determines that a second device is associated with a second authentication credential. At block 715, processing logic determines that the second authentication credential is associated with the first application at the second device. After block 715, the method of FIG. 7 terminates.

Figure 8:
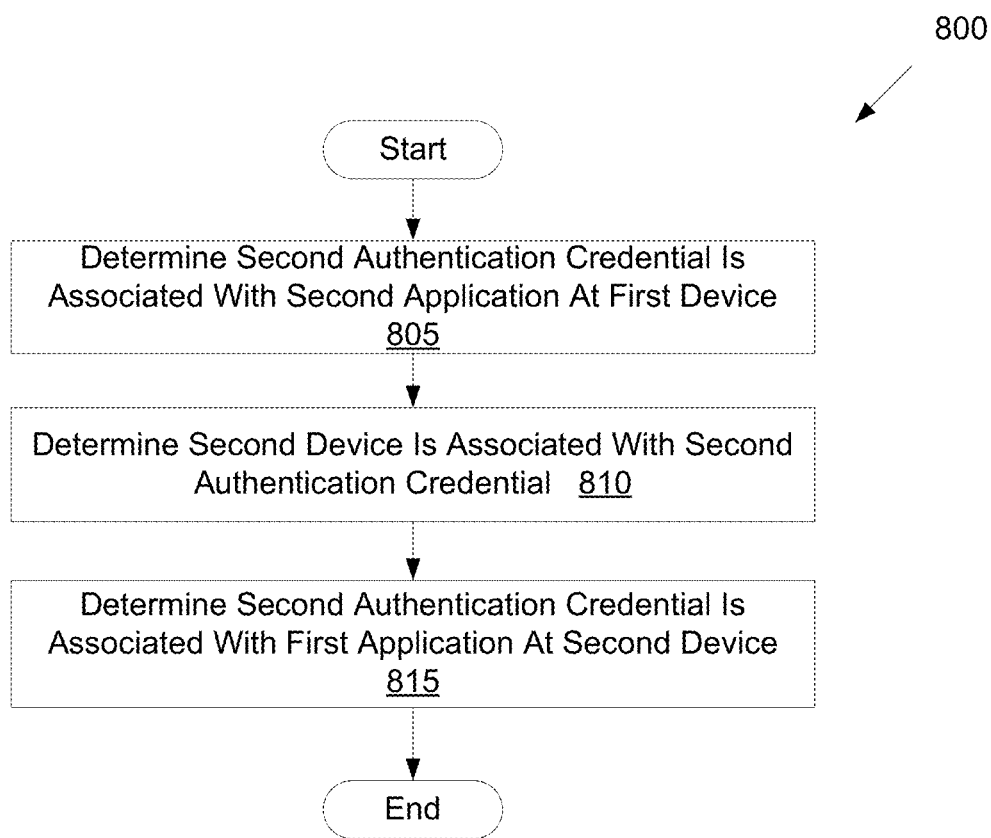
FIG. 8 depicts a flow diagram of an alternative example method for determining that an authentication credential is associated with a stored authentication identity, in accordance with one or more embodiments of the present disclosure.

FIG. 8 depicts a flow diagram of an example method 800 for determining that an authentication credential is associated with a stored authentication identity. The method may be performed by processing logic that may comprise hardware (circuitry, dedicated logic, etc.), software (such as is run on a general purpose computer system or a dedicated machine), or a combination of both. In one illustrative example, method 800 may be performed by identity service 120 of FIG. 1, identity service 225 of FIG. 2, and/or identity service 300 of FIG. 3. Alternatively, some or all of method 800 might be performed by another module or machine. It should be noted that blocks depicted in FIG. 8 could be performed simultaneously (at least partially overlapping in time) or in a different order than that depicted.

At block 805, processing logic determines that a second authentication credential is associated with a second application at a first device. At block 810, processing logic determines that a second device is associated with the second authentication credential. At block 815, processing logic determines that the second authentication credential is associated with the first application at the second device. After block 815, the method of FIG. 8 terminates.

Figure 9:
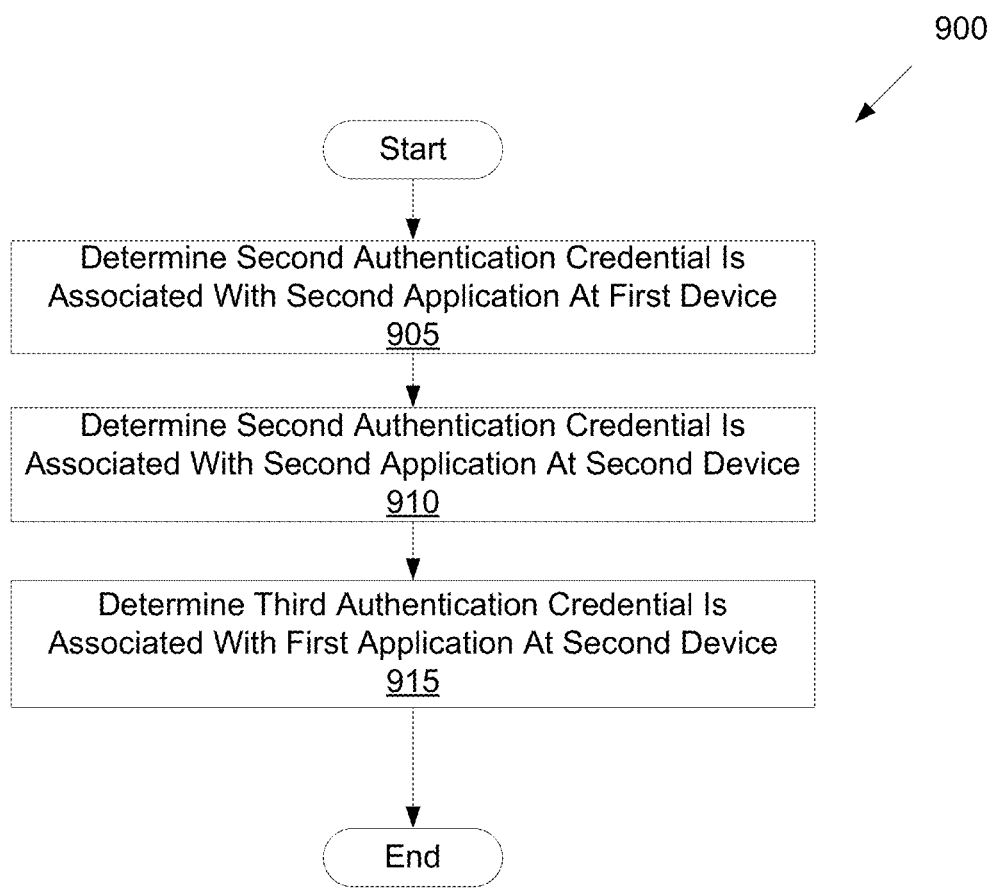
FIG. 9 depicts a flow diagram of an alternative example method for determining that an authentication credential is associated with a stored authentication identity, in accordance with one or more embodiments of the present disclosure.

FIG. 9 depicts a flow diagram of an example method 900 for determining that an authentication credential is associated with a stored authentication identity. The method may be performed by processing logic that may comprise hardware (circuitry, dedicated logic, etc.), software (such as is run on a general purpose computer system or a dedicated machine), or a combination of both. In one illustrative example, method 900 may be performed by identity service 120 of FIG. 1, identity service 225 of FIG. 2, and/or identity service 300 of FIG. 3. Alternatively, some or all of method 900 might be performed by another module or machine. It should be noted that blocks depicted in FIG. 9 could be performed simultaneously (at least partially overlapping in time) or in a different order than that depicted.

At block 905, processing logic determines that a second authentication credential is associated with a second application at a first device. At block 910, processing logic determines that the second authentication credential is associated with the second application at a second device. At block 915, processing logic determines that a third authentication credential is associated with the first application at the second device. After block 915, the method of FIG. 9 terminates.

Figure 10:
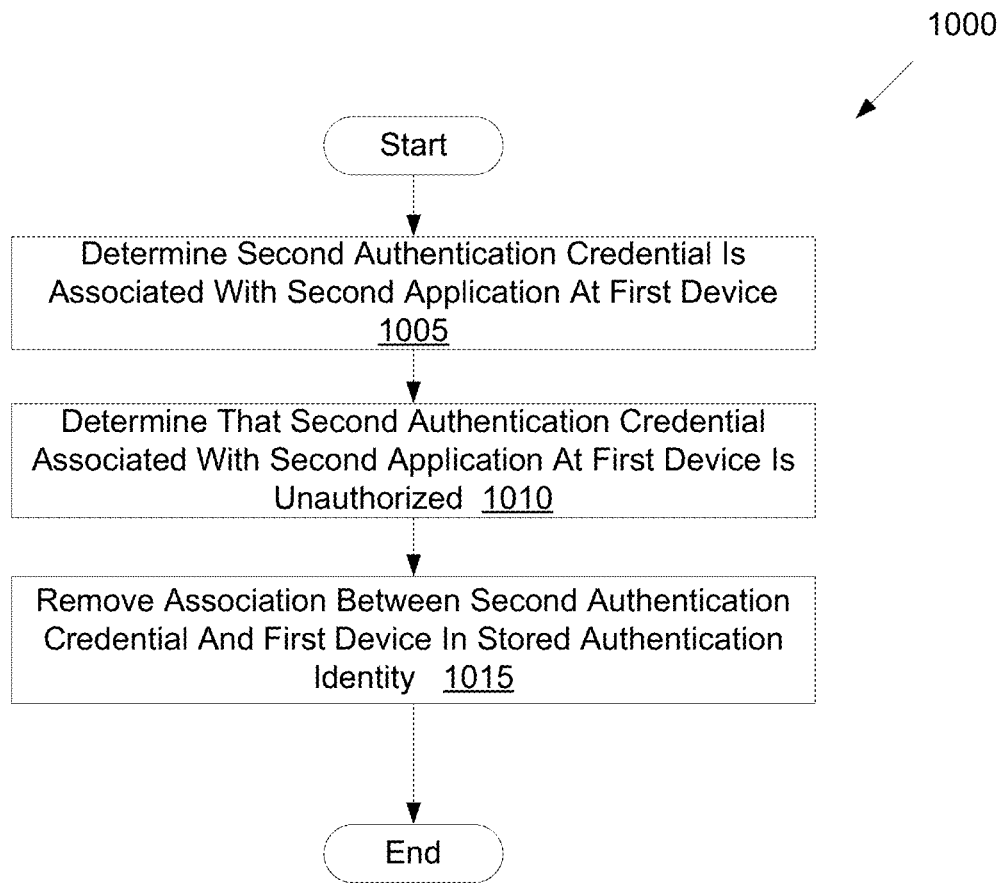
FIG. 10 depicts a flow diagram of an example method for removing an association with a stored identity, in accordance with one or more embodiments of the present disclosure.

FIG. 10 depicts a flow diagram of an example method 1000 for removing an association with a stored identity. The method may be performed by processing logic that may comprise hardware (circuitry, dedicated logic, etc.), software (such as is run on a general purpose computer system or a dedicated machine), or a combination of both. In one illustrative example, method 1000 may be performed by identity service 120 of FIG. 1, identity service 225 of FIG. 2, and/or identity service 300 of FIG. 3. Alternatively, some or all of method 1000 might be performed by another module or machine. It should be noted that blocks depicted in FIG. 10 could be performed simultaneously (at least partially overlapping in time) or in a different order than that depicted.

At block 1005, processing logic determines that a second authentication credential is associated with a second application at a first device. At block 1010, processing logic determines that the second authentication credential is associated with the second application at the first device is unauthorized. At block 1015, processing logic removes the association between the second authentication credential and the first device in the stored authentication identity. After block 1015, the method of FIG. 10 terminates.

Figure 11:
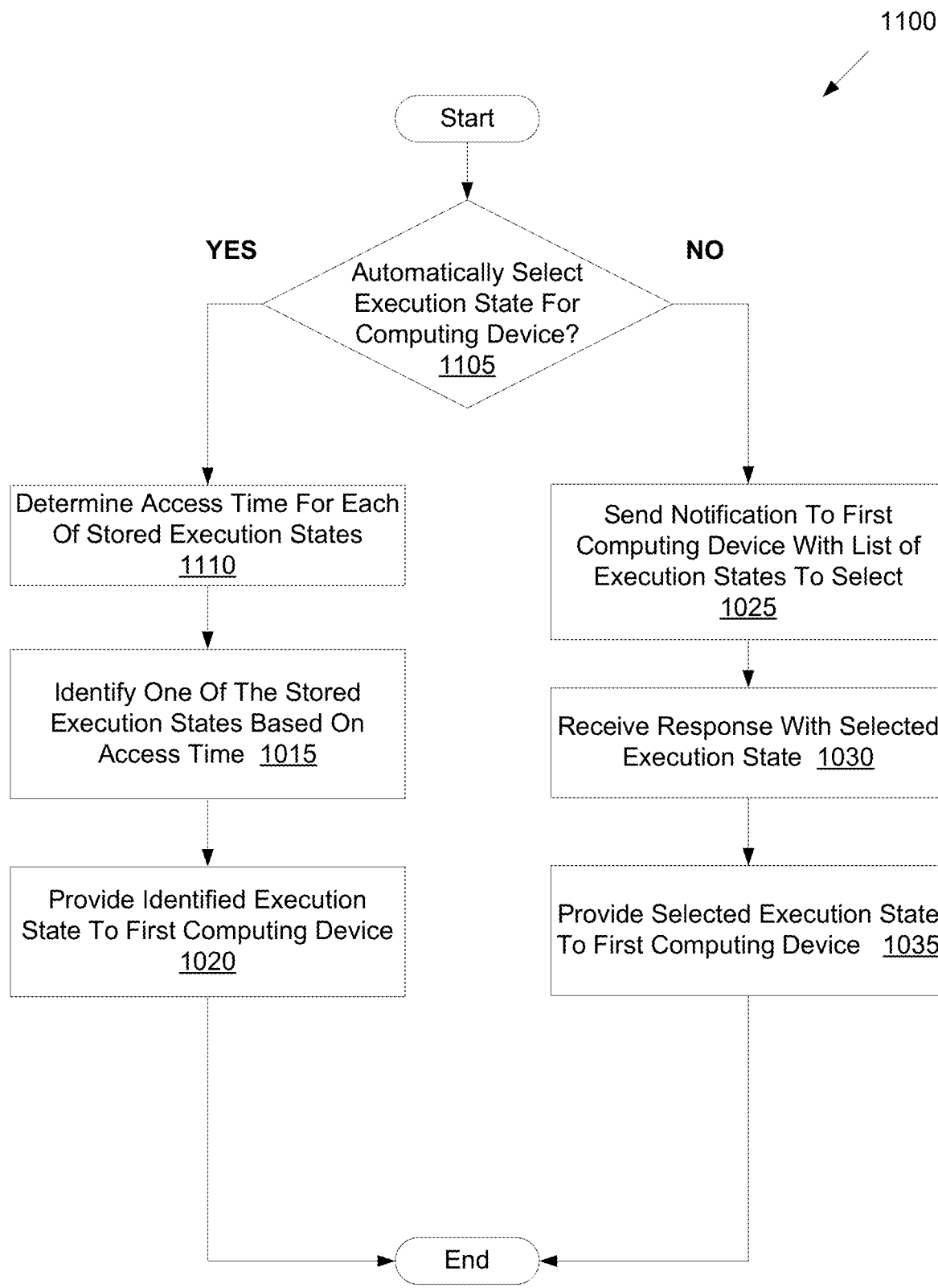
FIG. 11 depicts a flow diagram of an example method for providing an application execution state to a computing device, in accordance with one or more embodiments of the present disclosure.

FIG. 11 depicts a flow diagram of an example method 1100 for providing an application execution state to a computing device. The method may be performed by processing logic that may comprise hardware (circuitry, dedicated logic, etc.), software (such as is run on a general purpose computer system or a dedicated machine), or a combination of both. In one illustrative example, method 1100 may be performed by identity service 120 of FIG. 1, identity service 225 of FIG. 2, and/or identity service 300 of FIG. 3. Alternatively, some or all of method 1100 might be performed by another module or machine. It should be noted that blocks depicted in FIG. 11 could be performed simultaneously (at least partially overlapping in time) or in a different order than that depicted.

At block 1105, processing logic determines whether to automatically select an execution state for a computing device. Processing logic may make this determination based on a configuration setting for the stored identity associated with an authentication credential received by the computing device. Alternatively, processing logic may make this determination based on a specific request from the computing device. If processing logic determines that the execution state should be automatically selected, processing continues to block 1110. Otherwise, processing continues to block 1125.

At block 1110, processing logic determines an access time for each of the stored execution states. At block 1115, processing logic identifies one of the stored execution states based on the access time. At block 1120, processing logic provides the identified execution state to the first computing device. After block 1120, the method of FIG. 11 terminates.

If, at block 1105, processing logic determines that the execution state should not be automatically selected, processing continues to block 1125. At block 1125, processing logic sends a notification to the first computing device with a list of execution states that may be selected. At block 1130, processing logic receives a response with the selected execution state. At block 1135, processing logic provides the selected execution state to the first computing device. After block 1135, the method of FIG. 11 terminates.

Figure 12:
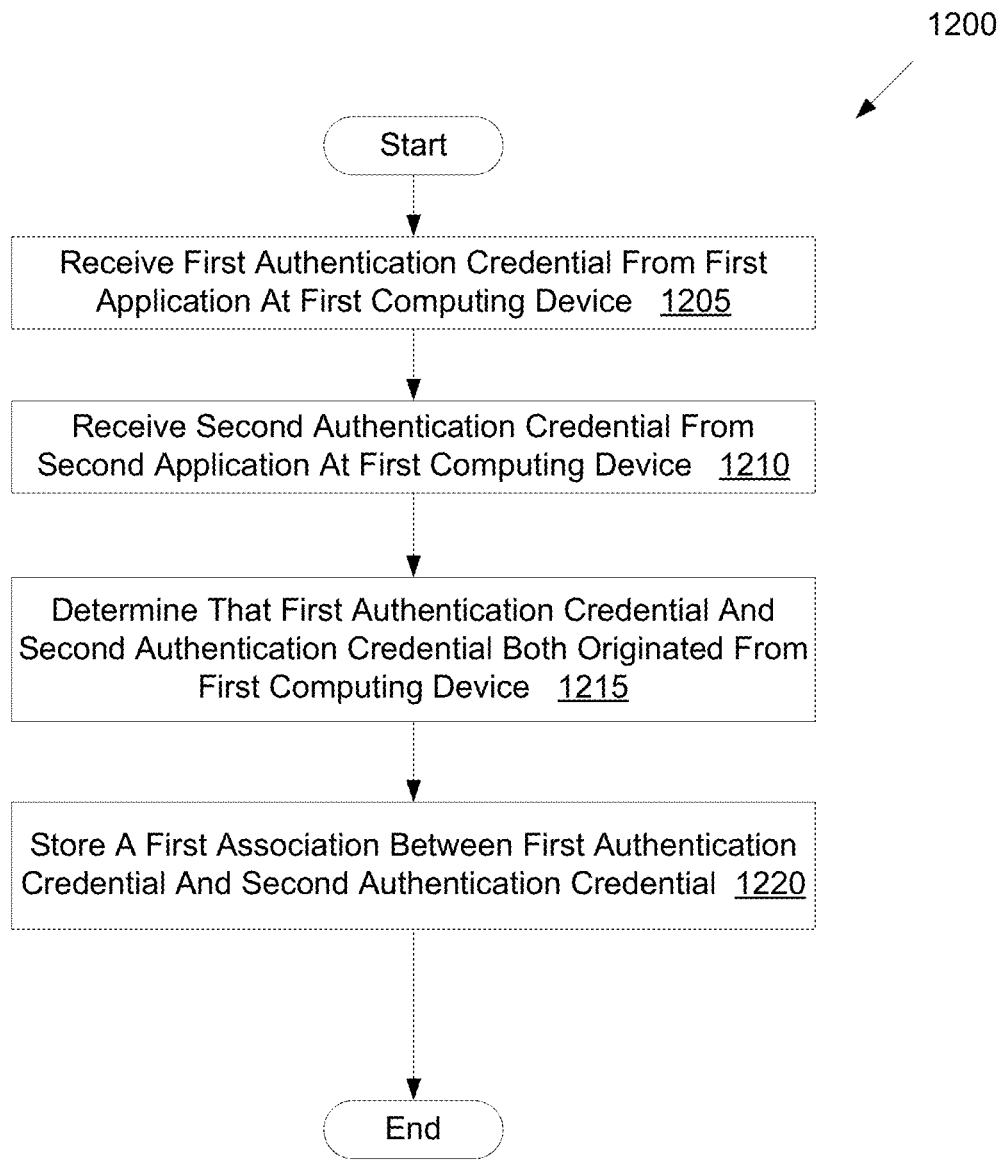
FIG. 12 depicts a flow diagram of an example method for generating a stored authentication identity, in accordance with one or more embodiments of the present disclosure.

FIG. 12 depicts a flow diagram of an example method 1200 for generating a stored authentication identity. The method may be performed by processing logic that may comprise hardware (circuitry, dedicated logic, etc.), software (such as is run on a general purpose computer system or a dedicated machine), or a combination of both. In one illustrative example, method 1200 may be performed by identity service 120 of FIG. 1, identity service 225 of FIG. 2, and/or identity service 300 of FIG. 3. Alternatively, some or all of method 1200 might be performed by another module or machine. It should be noted that blocks depicted in FIG. 12 could be performed simultaneously (at least partially overlapping in time) or in a different order than that depicted.

At block 1205, processing logic receives a first authentication credential from a first application at a first computing device. At block 1210, processing logic receives a second authentication credential from a second application at the first computing device. At block 1215, processing logic determines that the first authentication credential and the second authentication credential both originated from the first computing device. At block 1220, processing logic stores a first association between the first authentication credential and the second authentication credential. After block 1220, the method of FIG. 12 terminates.

Figure 13:
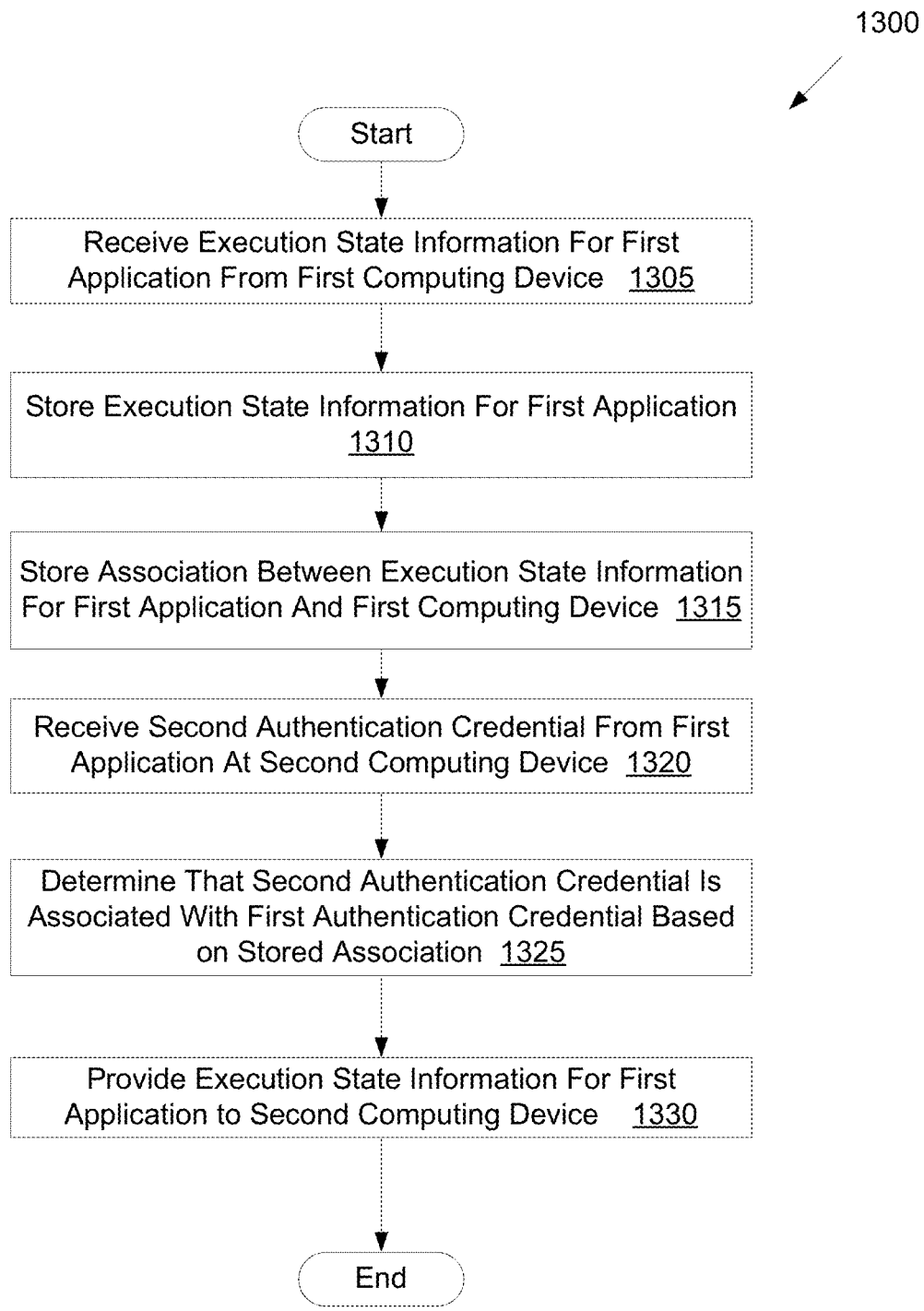
FIG. 13 depicts a flow diagram of an example method for updating a stored authentication identity based on received authentication behavior, in accordance with one or more embodiments of the present disclosure.

FIG. 13 depicts a flow diagram of an example method 1300 for updating a stored authentication identity based on received authentication behavior. The method may be performed by processing logic that may comprise hardware (circuitry, dedicated logic, etc.), software (such as is run on a general purpose computer system or a dedicated machine), or a combination of both. In one illustrative example, method 1300 may be performed by identity service 120 of FIG. 1, identity service 225 of FIG. 2, and/or identity service 300 of FIG. 3. Alternatively, some or all of method 1300 might be performed by another module or machine. It should be noted that blocks depicted in FIG. 13 could be performed simultaneously (at least partially overlapping in time) or in a different order than that depicted.

At block 1305, processing logic receives execution state information from a first application from a first computing device. At block 1310, processing logic stores the execution state information for the first application. At block 1315, processing logic stores an association between the execution state information for the first application and the first computing device. At block 1320, processing logic receives a second authentication credential from the first application at a second computing device. At block 1325, processing logic determines that the second authentication credential is associated with the first authentication credential based on the stored association. At block 1330, processing logic provides the execution state information for the first application to the second computing device. After block 1330, the method of FIG. 13 terminates.

Figure 14:
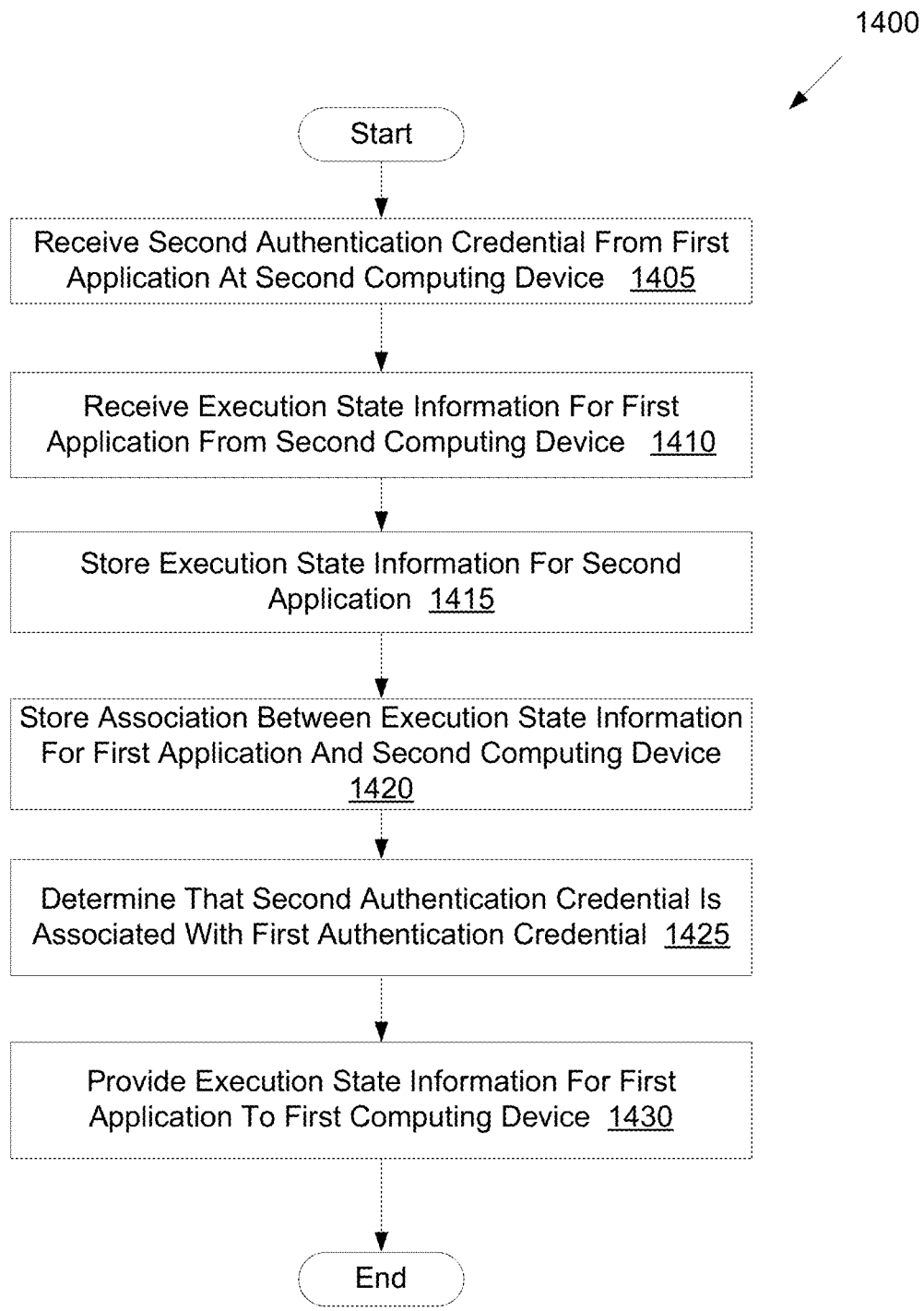
FIG. 14 depicts a flow diagram of an example method for providing an application execution state to a computing device based on a stored authentication identity, in accordance with one or more embodiments of the present disclosure.

FIG. 14 depicts a flow diagram of an example method 1400 for providing an application execution state to a computing device based on a stored authentication identity. The method may be performed by processing logic that may comprise hardware (circuitry, dedicated logic, etc.), software (such as is run on a general purpose computer system or a dedicated machine), or a combination of both. In one illustrative example, method 1400 may be performed by identity service 120 of FIG. 1, identity service 225 of FIG. 2, and/or identity service 300 of FIG. 3. Alternatively, some or all of method 1400 might be performed by another module or machine. It should be noted that blocks depicted in FIG. 14 could be performed simultaneously (at least partially overlapping in time) or in a different order than that depicted.

At block 1405, processing logic receives second authentication credential from first application at a second computing device. At block 1410, processing logic receives execution state information for the first application from a second computing device. At block 1415, processing logic stores execution state information for the second application. At block 1420, processing logic stores an association between the execution state information for the first application and the second computing device. At block 1425, processing logic determines that the second authentication credential is associated with the first authentication credential. At block 1430, processing logic provides the execution state information for the first application to the first computing device. After block 1430, the method of FIG. 14 terminates.

Figure 15:
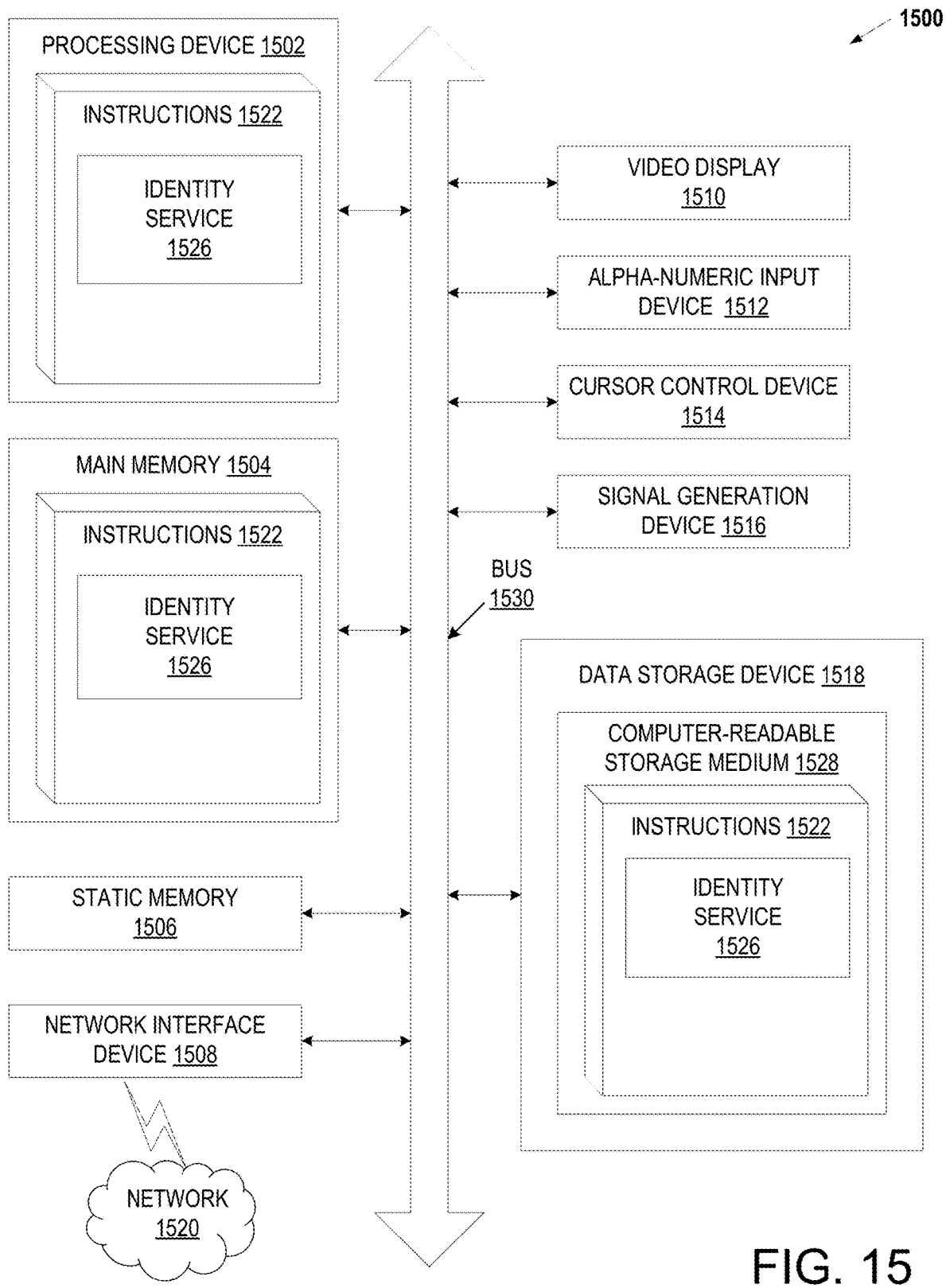
FIG. 15 depicts a block diagram of an illustrative computer system operating in accordance with one or more embodiments of the present disclosure.

FIG. 15 depicts an example computer system 1500 which can perform any one or more of the methods described herein. In one example, computer system 1500 may correspond to computer network 200 of FIG. 2. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The example computer system 1500 includes a processing device 1502, a main memory 1504 (e.g., read-only memory (ROM), flash memory, dynamic random access memory (DRAM) such as synchronous DRAM (SDRAM)), a static memory 1506 (e.g., flash memory, static random access memory (SRAM)), and a data storage device 1518, which communicate with each other via a bus 1530.

Processing device 1502 represents one or more general-purpose processing devices such as a microprocessor, central processing unit (CPU), graphical processing unit (GPU), or the like. More particularly, the processing device 1502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1502 may also be one or more special-purpose processing devices such as an application specific integrated circuit (ASIC), a field programmable gate array (FPGA), a digital signal processor (DSP), network processor, or the like. The processing device 1502 is configured to execute instructions 1522 that can include identity service 1526 for performing the operations and steps discussed herein (e.g., corresponding to the methods of FIGS. 6-14, etc.).

The computer system 1500 may further include a network interface device 1508. The computer system 1500 also may include a video display unit 1510 (e.g., a liquid crystal display (LCD) or a cathode ray tube (CRT)), an alphanumeric input device 1512 (e.g., a keyboard), a cursor control device 1514 (e.g., a mouse), and a signal generation device 1516 (e.g., a speaker). In one illustrative example, the video display unit 1510, the alphanumeric input device 1512, and the cursor control device 1514 may be combined into a single component or device (e.g., an LCD touch screen).

The data storage device 1518 may include a computer-readable medium 1528 on which is stored one or more sets of instructions or software 1522 such as identity service 1526 (e.g., corresponding to the methods of FIGS. 6-14, etc.) embodying any one or more of the methodologies or functions described herein. Identity service 1526 may also reside, completely or at least partially, within the main memory 1504 and/or within the processing device 1502 during execution thereof by the computer system 1500, the main memory 1504 and the processing device 1502 also constituting computer-readable media. Identity service 1526 may further be transmitted or received over a network via the network interface device 1522.

While the computer-readable storage medium 1528 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled. Particularly, while embodiments of the present disclosure have been described above as applying to polygonal models, these embodiments can also be applied in a similar manner to other three dimensional surface representation structures such as nurbs, splines, subdivision surfaces, etc.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "identifying," "providing," "storing," "associating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

Embodiments of the present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A system, comprising:
   a memory; and
   a processing device coupled to the memory, the processing device configured to:
   receive a first authentication credential from a first computing device;
   determine that the first authentication credential is associated, by a memory data structure, with a second authentication credential received from a second computing device, wherein the second authentication credential is different from the first authentication credential;
   identify a plurality of stored execution states referenced by the memory data structure in association with the first authentication credential and the second authentication credential, wherein the plurality of stored execution states comprises a first execution state associated with the first computing device and a second execution state associated with the second computing device; and
   provide the second execution state to the first computing device.

2. The system of claim 1, wherein the processing device is further configured to:
   receive an updated execution state from the first computing device;
   store the updated execution state; and
   associate the updated execution state with the memory data structure.

3. The system of claim 1, wherein the processing device is further configured to:
   select an execution state of the plurality of stored execution states based an access time of the execution state; and
   provide the selected execution state to the first computing device.

4. The system of claim 1, wherein the memory data structure includes a parent node and a child node of the parent node, wherein the parent node represents the first authentication credential and wherein the child node represents the second authentication credential.

5. The system of claim 1, wherein the memory data structure includes a parent node, a first child node of the parent node, and a second child node of the parent node, wherein the parent node represents the first authentication credential, the first child node represents the second authentication credential, and the second child node represents the second execution state.

6. The system of claim 1, wherein the second execution state is a most recently saved execution state of the plurality of stored execution states.

7. The system of claim 1, wherein the first execution state comprises configuration information of an application running on the first computing device.

8. The system of claim 1, wherein the processing device is further configured to:
   receive the first execution state from the first computing device responsive to terminating an application running on the first computing device.

9. The system of claim 1, wherein the processing device is further configured to:
   receive the first execution state from the first computing device responsive to detecting a specific user interaction with an application running on the first computing device.

10. A non-transitory computer-readable storage medium comprising executable instructions that, when executed by a processing device, cause the processing device to:
    receive a first authentication credential from a first computing device;
    determine that the first authentication credential is associated, by a memory data structure, with a second authentication credential received from a second computing device, wherein the second authentication credential is different from the first authentication credential;
    identify a plurality of stored execution states referenced by the memory data structure in association with the first authentication credential and the second authentication credential, wherein the plurality of stored execution states comprises a first execution state associated with the first computing device and a second execution state associated with the second computing device; and provide the second execution state to the first computing device.

11. The non-transitory computer-readable storage medium of claim 10, further comprising executable instructions that, when executed by the processing device, cause the processing device to:
receive an updated execution state from the first computing device;
store the updated execution state; and
associate the updated execution state with the memory data structure.

12. The non-transitory computer-readable storage medium of claim 10, further comprising executable instructions that, when executed by the processing device, cause the processing device to:
select an execution state of the plurality of stored execution states based an access time of the execution state; and
provide the selected execution state to the first computing device.

13. The non-transitory computer-readable storage medium of claim 10, wherein the memory data structure includes a parent node and a child node of the parent node, wherein the parent node represents the first authentication credential and wherein the child node represents the second authentication credential.

14. The non-transitory computer-readable storage medium of claim 10, wherein the memory data structure includes a parent node, a first child node of the parent node, and a second child node of the parent node, wherein the parent node represents the first authentication credential, the first child node represents the second authentication credential, and the second child node represents the second execution state.

15. The non-transitory computer-readable storage medium of claim 10, further comprising executable instructions that, when executed by the processing device, cause the processing device to:
receive the first execution state from the first computing device responsive to detecting a specific user interaction with an application running on the first computing device.

16. A method, comprising:
receiving, by a processing device, a first authentication credential from a first computing device;
determining that the first authentication credential is associated, by a memory data structure, with a second authentication credential received from a second computing device, wherein the second authentication credential is different from the first authentication credential;
identifying a plurality of stored execution states referenced by the memory data structure in association with the first authentication credential and the second authentication credential, wherein the plurality of stored execution states comprises a first execution state associated with the first computing device and a second execution state associated with the second computing device; and
providing the second execution state to the first computing device.

17. The method of claim 16, further comprising:
receiving an updated execution state from the first computing device;
storing the updated execution state; and
associating the updated execution state with the memory data structure.

18. The method of claim 16, further comprising:
selecting an execution state of the plurality of stored execution states based an access time of the execution state; and
providing the selected execution state to the first computing device.

19. The method of claim 16, wherein the memory data structure includes a parent node and a child node of the parent node, wherein the parent node represents the first authentication credential and wherein the child node represents the second authentication credential.

20. The method of claim 16, further comprising:
receiving the first execution state from the first computing device responsive to detecting a specific user interaction with an application running on the first computing device.

* * * * *